(12) United States Patent
Belleschi et al.

(10) Patent No.: US 10,736,097 B2
(45) Date of Patent: Aug. 4, 2020

(54) SYSTEMS AND METHODS OF HANDLING COLLISIONS BETWEEN MULTIPLE SEMI-PERSISTENT GRANTS

(71) Applicant: Telefonaktiebolaget LM Ericsson (publ), Stockholm (SE)

(72) Inventors: Marco Belleschi, Solna (SE); Mattias Bergström, Stockholm (SE); Magnus Stattin, Upplands Väsby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 45 days.

(21) Appl. No.: 15/675,923

(22) Filed: Aug. 14, 2017

(65) Prior Publication Data

US 2018/0049193 A1 Feb. 15, 2018

Related U.S. Application Data

(60) Provisional application No. 62/502,551, filed on May 5, 2017, provisional application No. 62/502,545, filed on May 5, 2017.

(30) Foreign Application Priority Data

Aug. 12, 2016 (WO) ................ PCT/CN2016/094976
Jan. 22, 2017 (WO) ................ PCT/CN2017/072066

(51) Int. Cl.
*H04W 72/04* (2009.01)
*H04W 72/02* (2009.01)
(Continued)

(52) U.S. Cl.
CPC ....... *H04W 72/0446* (2013.01); *H04W 72/02* (2013.01); *H04W 72/048* (2013.01);
(Continued)

(58) Field of Classification Search
None
See application file for complete search history.

(56) References Cited

U.S. PATENT DOCUMENTS

2010/0050034 A1 2/2010 Che et al.
2011/0310986 A1* 12/2011 Heo .................. H04L 5/001
375/259
(Continued)

FOREIGN PATENT DOCUMENTS

| CN | 101965707 A | 2/2011 |
| CN | 102595596 A | 7/2012 |

(Continued)

OTHER PUBLICATIONS

Polonelli, T. et al. "An ultra-low power wake up radio with addressing and retransmission capabilities for advanced energy efficient MAC protocols" (poster abstract), Univ Bologna, 2016 Proceedings of the 15th ACM/IEEE International Conference on Information Processing in Sensor Networks (IPSN), Article No. 67, Apr. 11-14, 2016.

(Continued)

*Primary Examiner* — Brandon M Renner
(74) *Attorney, Agent, or Firm* — Coats & Bennett, PLLC

(57) ABSTRACT

Systems and methods of handling collisions between multiple semi-persistent grants are presented herein. In one exemplary embodiment, a method performed by a wireless device in a wireless communications system comprises obtaining selection criteria that is predefined or configured as being the criteria by which both the wireless device and a network node or another wireless device selects one of multiple activated semi-persistent configurations assigned to the wireless device responsive to determining that the multiple configurations have granted a same radio resource. Further, the method includes selecting one of the multiple configurations based on the selection criteria. Also, the (Continued)

method includes transmitting or receiving on that radio resource in accordance with the selected configuration.

35 Claims, 28 Drawing Sheets

(51) Int. Cl.
*H04W 92/18* (2009.01)
*H04W 84/00* (2009.01)
*H04W 72/10* (2009.01)
*H04W 74/02* (2009.01)

(52) U.S. Cl.
CPC ........ *H04W 72/0453* (2013.01); *H04W 72/10* (2013.01); *H04W 74/02* (2013.01); *H04W 84/005* (2013.01); *H04W 92/18* (2013.01)

(56) References Cited

U.S. PATENT DOCUMENTS

| | | | |
|---|---|---|---|
| 2013/0229998 A1* | 9/2013 | Noh | H04L 5/001 370/329 |
| 2015/0173048 A1 | 6/2015 | Seo et al. | |
| 2015/0256296 A1 | 9/2015 | Hsieh | |
| 2016/0088635 A1 | 3/2016 | Davydov et al. | |
| 2016/0233903 A1* | 8/2016 | Wu | H04B 1/12 |
| 2017/0026942 A1* | 1/2017 | Vajapeyam | H04W 72/042 |
| 2017/0347378 A1* | 11/2017 | Le-Ngoc | H04W 72/0446 |
| 2018/0007667 A1* | 1/2018 | You | H04L 5/14 |
| 2019/0090266 A1* | 3/2019 | Zhao | H04W 72/04 |

FOREIGN PATENT DOCUMENTS

| | | |
|---|---|---|
| CN | 104349483 A | 2/2015 |
| CN | 104901900 A | 9/2015 |
| WO | 2013051976 A1 | 4/2013 |

OTHER PUBLICATIONS

NTT Docomo, Inc., 3GPP TSG RAN WG1 Meeting #85, R1-165193, (E)PDCCH for sidelink SPS configuration switching, 6.2.2.3.1, Nanjing, China, May 23-27, 2016.

LG Electronics, 3GPP TSG RAN WG1 Meeting #85, R1-164538, Discussion on UL SPS for V2X, 6.2.9.2.2, Nanjing, China, May 23-27, 2016.

Qualcomm Incorporated, 3GPP TSG-RAN WG2, Meeting #94, R2-164063, SPS for V2V Communication, 8.2.4, Nanjing, China, May 23-27, 2016.

CATT, 3GPP TSG-RAN WG2 Meeting #60bis, R2-080121, Collision avoidance in uplink semi-persistent scheduling for TDD, 511.9, Sevilla, Spain, Jan. 14-18, 2008.

Samsung, 3GPP TSG-RAN WG2 Meeting #77, R2-120236, UE soft buffer management in case of more than 8 HIARQ processes, 6.6, Dresden, Germany, Feb. 6-10, 2012.

Ericsson, St-Ericsson, 3GPP TSG RAN WG1 Meeting #64, R1-111100, Further views on soft buffer handling for Rel-10 UEs, 6.21, Taipei, Taiwan, Feb. 21-25, 2011.

* cited by examiner

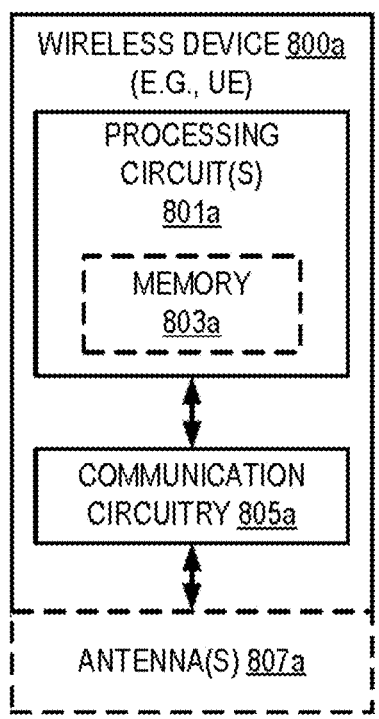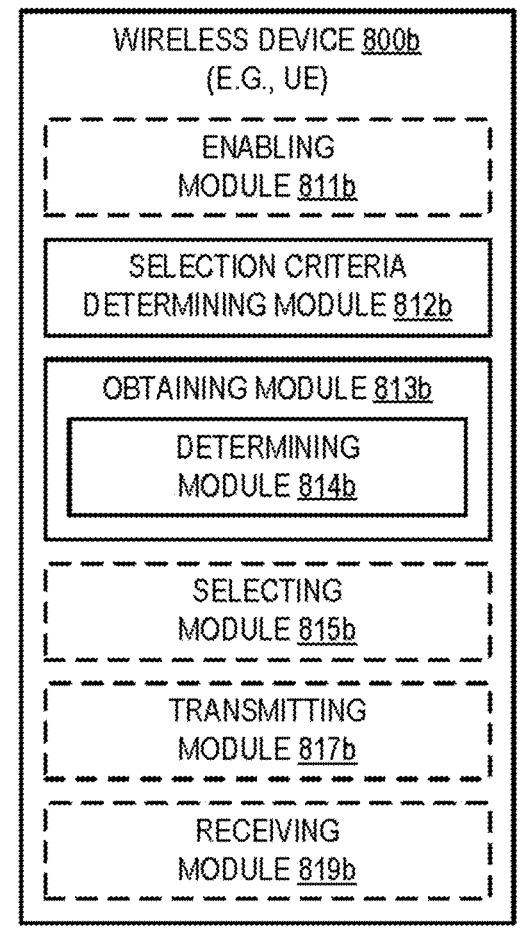
FIG. 8A
FIG. 8B

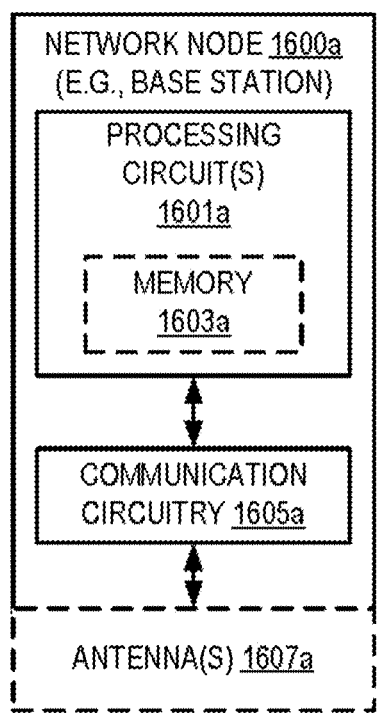
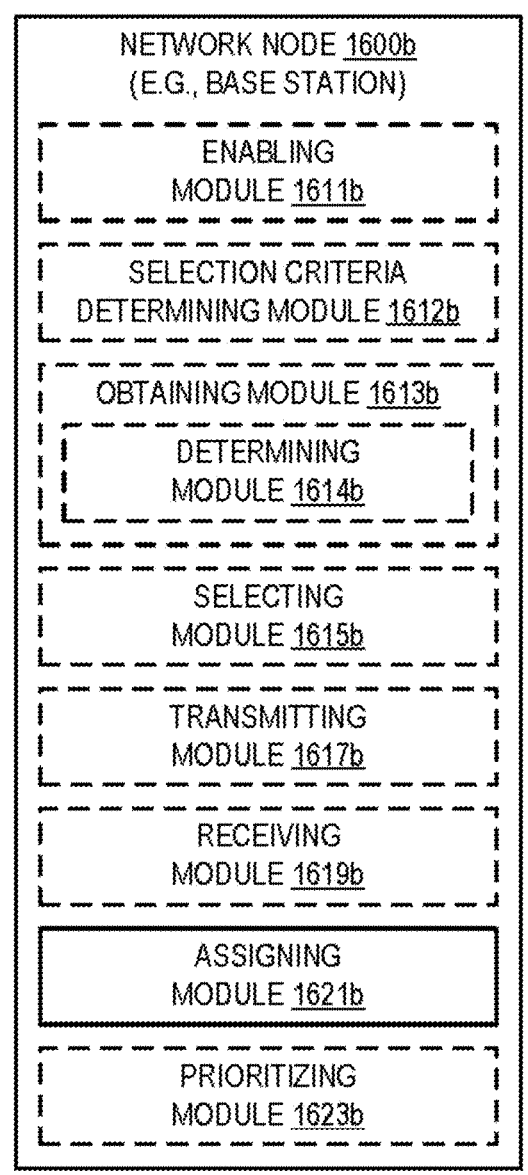
FIG. 16A
FIG. 16B

SYSTEMS AND METHODS OF HANDLING COLLISIONS BETWEEN MULTIPLE SEMI-PERSISTENT GRANTS

CROSS REFERENCE TO RELATED APPLICATIONS

This application claims the benefit of both U.S. Provisional App. No. 62/502,551, filed May 5, 2017, and U.S. Provisional App. No. 62/502,545, filed May 5, 2017, and claims priority to both International Pat. App. No. PCT/CN2017/072066, filed Jan. 22, 2017, and International Pat. App. No. PCT/CN2016/094976, filed Aug. 12, 2016, all of which are hereby incorporated by reference as if fully set forth herein.

FIELD OF DISCLOSURE

The present disclosure relates generally to the field of communications, and in particular to handling collisions between multiple semi-persistent grants.

BACKGROUND

In $3^{rd}$ Generation Partnership Project (3GPP) Release 12, the Long Term Evolution (LTE) standard has been extended with support of device to device (D2D) communications (e.g., "sidelink" communications) features targeting both commercial and public safety applications, as illustrated in FIG. 1. Some applications enabled by 3GPP Release 12 LTE are device discovery, where devices are able to sense the proximity of another device and associated application by broadcasting and detecting discovery messages that carry device and application identities. Another application consists of direct communication based on physical channels terminated directly between devices.

One of the potential extensions for the device-to-device (D2D) work consists of support for vehicle-to-anything (V2x) communication, which includes any combination of direct communication between a vehicle and another vehicle (V2V), a pedestrian (V2P), and infrastructure (V2I). V2x communication may take advantage of a network infrastructure, when available, but at least basic V2x connectivity should be possible even in case of lack of coverage. Providing an LTE-based V2x interface may be economically advantageous because of the LTE economies of scale and it may enable tighter integration between communications with the V2I, V2P, and V2V communications, as compared to using a dedicated V2x technology. V2x communications may carry both non-safety and safety information, where each of the applications and services may be associated with specific requirements sets (e.g., latency, reliability, capacity).

The European Telecommunications Standards Institute (ETSI) has defined two types of messages for road safety: Co-operative Awareness Message (CAM) and Decentralized Environmental Notification Message (DENM). A CAM message is intended to enable vehicles, including emergency vehicles, to notify their presence and other relevant parameters in a broadcast fashion. Such messages target other vehicles, pedestrians, and infrastructure, and are handled by their applications. The CAM message also serves as active assistance to safety driving for normal traffic. The availability of a CAM message is indicatively checked for every one hundred milliseconds (100 ms.), yielding a maximum detection latency requirement of no more than one hundred milliseconds ($\leq$100 ms.) for most messages. A DENM message is event-triggered, such as by braking, and the availability of a DENM message is also checked for every one hundred milliseconds (100 ms.). Depending on the use case latency requirements for CAM and DENM may vary significantly. As an example, latency may vary from twenty milliseconds (20 ms.) for pre-crash warnings, to one hundred milliseconds (100 ms.) for emergency stops or queue warnings, or to one thousand milliseconds (1000 ms.) for non-safety related use cases such as traffic flow optimization and curve speed warnings. The package size of CAM and DENM message varies from 100+ to 800+ bytes and the typical size is around three hundred (300) bytes depending on the specific V2X use case, message type (e.g., DENM is supposed to be larger than CAM) and on the security format included in the packet (e.g., full certificate or certificate digest). The message is supposed to be detected by all vehicles in proximity.

The SAE (Society of the Automotive Engineers) also defined the Basic Safety Message (BSM) for DSRC with various messages sizes defined. According to the importance and urgency of the messages, the BSMs are further classified into different priorities. Sidelink transmissions (also known as D2D or ProSe) over the so-called PC5 interface (e.g., sidelink interface) in cellular spectrum have been standardized in 3GPP since 3GPP Release 12. In 3GPP Release 12, two different operative modes have been specified. In a first operation mode (mode-1), a user equipment (UE) in RRC-_CONNECTED mode requests D2D resources and an eNodeB (eNB) grants them via a physical downlink control channel (PDCCH) (e.g., downlink control information 5, DCI5) or via dedicated signaling. In a second operation mode (mode-2), a UE autonomously selects resources for transmission from a pool of available resources that the eNB broadcasts via system information block (SIB) signaling for transmissions on carriers other than the primary cell (PCell) or via dedicated signaling for transmission on the PCell. Therefore, unlike the first operation mode, the second operation mode may be performed also by UEs in RRC_IDLE.

In 3GPP Release 14, the usage of sidelink is extended to the V2x domain. The design of the sidelink physical layer in 3GPP Release 12 has been dictated by the assumptions of a few number of UEs competing for the same physical resources in the spectrum, to carry voice packet for mission critical push-to-talk (MCPTT) traffic, and low-mobility. On the other hand, in V2x the sidelink should be able to cope with higher load scenario (i.e. hundreds of cars may potentially contend physical resources), to carry time/event triggered V2x messages (CAM, DNEM), and high mobility. For these reasons, 3GPP has discussed possible enhancements to the sidelink physical layer.

In order to properly exploit the available frequency resources, an eNB scheduler needs to execute resource allocation. In LTE, resource allocation decisions are taken on a transmission time interval (TTI) granularity which corresponds to one millisecond (1 ms.) Given a certain pool of available frequency resources and a certain amount of UEs connected to the cell, the scheduler may adopt different scheduling strategies to assign frequency resources to such UEs. Generally, the scheduler prioritizes the UEs according to the quality of service (QoS) requirement of different UE's traffic. For example, control plane signaling (e.g., RRC) is always prioritized over user plane data. Additionally, user plane data may be treated differently according to its QoS identifier (QCI) provided during data radio bearer (DRB) establishment. For instance, delay sensitive traffic (e.g., VoIP) may be subject to different scheduling policies than non-delay sensitive traffic (e.g., FTP/HTTP data streaming) so that delay sensitive traffic has a higher probability to fulfil certain latency constraints.

As previously described, V2X is also expected to be a delay sensitive and periodic type similarly to VoIP. Therefore, delay-aware schedulers would be a natural implementation solution to fit into the V2X framework. Among prior-art delay-aware schedulers, it is worth mentioning a delay-based scheduler (DBS) and a semi-persistent scheduler (SPS). DBS takes as input an estimation of the time spent by a certain packet in the downlink and uplink buffer (e.g., at UE), so that when a certain threshold is reached the packet gets higher priority and may be scheduled earlier than other packets in the buffer. In order to keep a better uplink buffer estimation, the DBS may use some traffic characteristics that are known a priori for that specific DRB (e.g., for VoIP, it is known that every twenty milliseconds (20 ms.) the UE generates a new Vol P packet).

Instead, SPS provides a semi-persistent resource allocation for UEs. This scheduling mechanism is specified in 3GPP and implies that the eNB configures via radio resource control (RRC) signaling a UE to use SPS resources with a certain configurable periodicity. The actual activation/release of SPS may be done dynamically via PDCCH (e.g., using a semi-persistent C-RNTI), which also indicates the frequency resources and the modulation and coding scheme to be used every $n^{th}$ subframe (e.g., as indicated in RRC configuration). SPS may also be re-activated meaning that a new PDCCH is transmitted carrying for a certain SPS configuration a different resource assignment (e.g., different PRB, MCS).

Further, multiple SPS configurations have been proposed. These multiple SPS configurations with different configuration parameters can be assigned by the base station to terminal devices. It has also been proposed to allow the multiple SPS configurations to be active simultaneously at one UE. In this case, the SPS configurations and UE assistance information may be linked to one or more radio bearers. However, such simultaneous activity of the multiple SPS configurations may cause collisions at the UE. In other words, the packets with these simultaneously active SPS configurations would collide in some subframes.

When such a collision occurs in a certain subframe, the terminal device or base station has to determine which SPS configuration should be used in the subframe. Such determination will result in tedious and inefficient use of network resources, as will be analyzed in the detailed description. At present, there is no effective or efficient proposal of how to utilize these SPS configurations at a terminal device in the V2x communications (e.g., via D2D sidelink or cellular uplink). Accordingly, there is a need for improved techniques for handling collisions between multiple semi-persistent grants. In addition, other desirable features and characteristics of the present disclosure will become apparent from the subsequent detailed description and embodiments, taken in conjunction with the accompanying figures and the foregoing technical field and background.

The Background section of this document is provided to place embodiments of the present disclosure in technological and operational context, to assist those of skill in the art in understanding their scope and utility. Unless explicitly identified as such, no statement herein is admitted to be prior art merely by its inclusion in the Background section.

SUMMARY

The following presents a simplified summary of the disclosure in order to provide a basic understanding to those of skill in the art. This summary is not an extensive overview of the disclosure and is not intended to identify key/critical elements of embodiments of the disclosure or to delineate the scope of the disclosure. The sole purpose of this summary is to present some concepts disclosed herein in a simplified form as a prelude to the more detailed description that is presented later.

Systems and methods of handling collisions between multiple semi-persistent grants are presented herein. According to one aspect, a method performed by a wireless device in a wireless communications system comprises obtaining selection criteria that is predefined or configured as being the criteria by which both the wireless device and a network node or another wireless device selects one of multiple activated semi-persistent configurations assigned to the wireless device responsive to determining that the multiple configurations have granted a same radio resource. Further, the method includes selecting one of the multiple configurations based on the selection criteria. Also, the method includes transmitting or receiving on that radio resource in accordance with the selected configuration.

According to one aspect, a wireless device is configured to obtain selection criteria that is predefined or configured as being the criteria by which both the wireless device and a network node or another wireless device selects one of multiple activated semi-persistent configurations assigned to the wireless device responsive to determining that the multiple configurations have granted a same radio resource. Further, the wireless device is configured to select one of the multiple configurations based on the selection criteria. The wireless device is also configured to transmit or receive on that radio resource in accordance with the selected configuration.

According to one aspect, a wireless device comprises at least one processor and a memory. Further, the memory comprises instructions, executable by the at least one processor, whereby the wireless device is configured to obtain selection criteria that is predefined or configured as being the criteria by which both the wireless device and a network node or another wireless device selects one of multiple activated semi-persistent configurations assigned to the wireless device responsive to determining that the multiple configurations have granted a same radio resource. Further, the memory comprises instructions whereby the wireless device is configured to select one of the multiple configurations based on the selection criteria. Also, the memory comprises instructions whereby the wireless device is configured to transmit or receive on that radio resource in accordance with the selected configuration.

According to one aspect, a method performed by a wireless device in a wireless communications system comprises obtaining selection criteria that is predefined or configured as being the criteria by which both the wireless device and another wireless device select one of multiple activated semi-persistent configurations used for wireless communications between the wireless device and the other wireless device responsive to determining that the multiple configurations have granted a same radio resource. Further, the method includes transmitting, to the other wireless device, the selection criteria.

According to one aspect, a wireless device is configured to obtain selection criteria that is predefined or configured as being the criteria by which both the wireless device and another wireless device select one of multiple activated semi-persistent configurations used for wireless communications between the wireless device and the other wireless device responsive to determining that the multiple configurations have granted a same radio resource. Further, the wireless device is configured to transmit, to the other wireless device, the selection criteria.

According to one aspect, a wireless device comprises at least one processor and a memory. Further, the memory comprises instructions, executable by the at least one processor, whereby the wireless device is configured to obtain selection criteria that is predefined or configured as being the criteria by which both the wireless device and another wireless device select one of multiple activated semi-persistent configurations used for wireless communications between the wireless device and the other wireless device responsive to determining that the multiple configurations have granted a same radio resource. Further, the memory includes instructions whereby the wireless device is configured to transmit, to the other wireless device, the selection criteria.

According to one aspect, a method performed by a network node in a wireless communications system comprises obtaining selection criteria that is predefined or configured as being the criteria by which both the network node and a wireless device selects one of multiple activated semi-persistent configurations assigned to the wireless device responsive to determining that the multiple configurations have granted a same radio resource. Further, the method may include selecting one of the multiple configurations based on the selection criteria. The method may also include transmitting or receiving, to or from the wireless device, on that radio resource in accordance with the selected configuration.

According to one aspect, a network node is configured to obtain selection criteria that is predefined or configured as being the criteria by which both the network node and a wireless device selects one of multiple activated semi-persistent configurations assigned to the wireless device responsive to determining that the multiple configurations have granted a same radio resource. Further, the network node is configured to select one of the multiple configurations based on the selection criteria. The network node is also configured to transmit or receive, to or from the wireless device, on that radio resource in accordance with the selected configuration.

According to one aspect, a network node comprises at least one processor and a memory. Further, the memory comprises instructions, executable by the at least one processor, whereby the wireless device is configured to obtain selection criteria that is predefined or configured as being the criteria by which both the network node and a wireless device selects one of multiple activated semi-persistent configurations assigned to the wireless device responsive to determining that the multiple configurations have granted a same radio resource. Further, the memory comprises instructions whereby the wireless device is configured to select one of the multiple configurations based on the selection criteria. Also, the memory comprises instructions whereby the wireless device is configured to transmit or receive, to or from the wireless device, on that radio resource in accordance with the selected configuration.

According to one aspect, a method performed by a network node in a wireless communications system comprises, in response to determining that multiple activated semi-persistent configurations assigned to a wireless device have granted a same radio resource, assigning, to the wireless device, one or more other radio resources that is capable of carrying data that is intended for transmission or reception on that same radio resource for each multiple configuration.

According to one aspect, a network node is configured to, in response to determining that multiple activated semi-persistent configurations assigned to a wireless device have granted a same radio resource, assign, to the wireless device, one or more other radio resources that is capable of carrying data that is intended for transmission or reception on that same radio resource for each multiple configuration.

According to one aspect, a network node comprises at least one processor and a memory. Further, the memory comprises instructions executable by the at least one processor whereby the network node is configured to, in response to determining that multiple activated semi-persistent configurations assigned to a wireless device have granted a same radio resource, assigning, to the wireless device, one or more other radio resources that is capable of carrying data that is intended for transmission or reception on that same radio resource for each multiple configuration.

BRIEF DESCRIPTION OF THE DRAWINGS

The present disclosure will now be described more fully hereinafter with reference to the accompanying drawings, in which embodiments of the disclosure are shown. However, this disclosure should not be construed as limited to the embodiments set forth herein. Rather, these embodiments are provided so that this disclosure will be thorough and complete, and will fully convey the scope of the disclosure to those skilled in the art. Like numbers refer to like elements throughout.

FIGS. 8A-B illustrate other embodiments of a wireless device in accordance with various aspects as described herein.

FIGS. 16A-B illustrate other embodiments of a network node in accordance with various aspects as described herein.

DETAILED DESCRIPTION

For simplicity and illustrative purposes, the present disclosure is described by referring mainly to an exemplary embodiment thereof. In the following description, numerous specific details are set forth in order to provide a thorough understanding of the present disclosure. However, it will be readily apparent to one of ordinary skill in the art that the present disclosure may be practiced without limitation to these specific details. In this description, well known methods and structures have not been described in detail so as not to unnecessarily obscure the present disclosure.

This disclosure includes describing systems and methods for handling collisions between multiple semi-persistent grants. 3GPP has agreed to introduce a new SPS protocol which provides the UE with multiple SPS configurations that can operate simultaneously. Depending on how the multiple SPS configurations are provided by the eNB, more than one SPS grant may be available in the same TTI. Often, due to SC-FDM constraints, the UE can select only one of the available SPS grants to perform an uplink transmission. The eNB could then detect and decode any of the granted resources to receive the UEs transmissions. Alternatively, the eNB could guess which resource grant the UE will use and then decode the resources associated with that grant. In some scenarios, the eNB may be limited in the number of granted resources that it can decode. Further, under this scenario, the capacity of the eNB may limit its system performance and resource utilization. Accordingly, the present disclosure describes, among other things, systems and methods for determining which of the configured SPS grants the UE should select when multiple configured SPS grants are made available to the UE in the same subframe.

Figure 1:
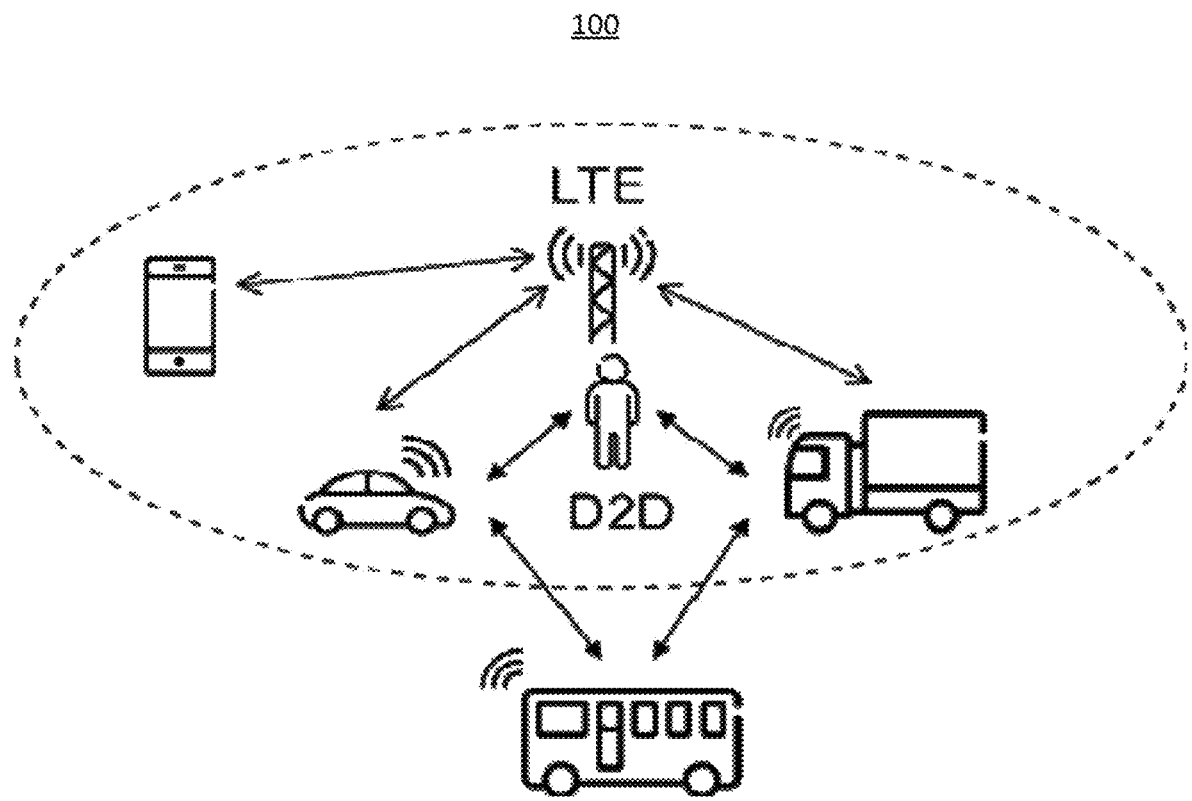
FIG. 1 illustrates an example of a wireless communication system supporting terrestrial cellular communications (e.g., LTE) and device-to-device (D2D) wireless communications (e.g., vehicle to anything (V2X) wireless communications).
Figure 2:
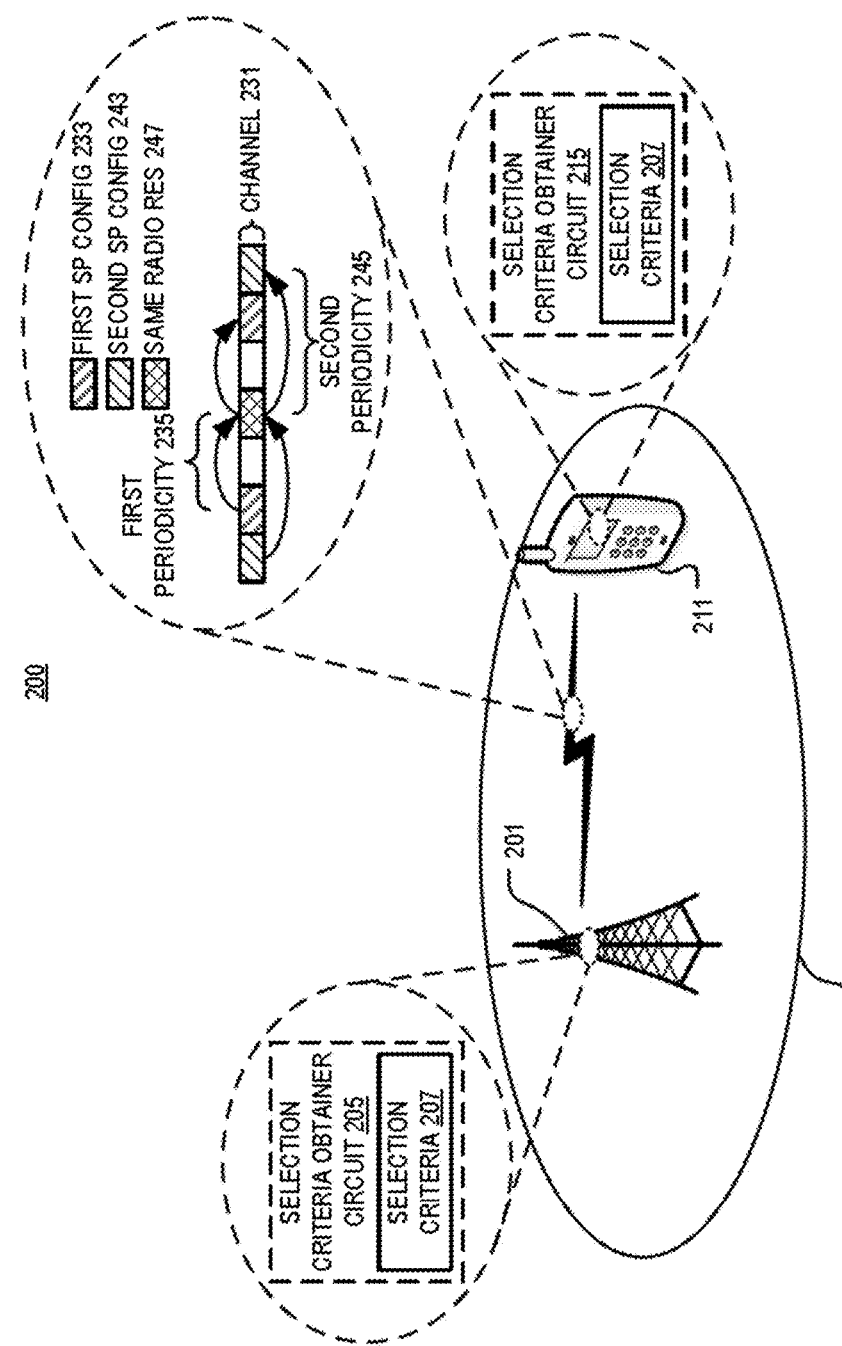
FIG. 2 illustrates one embodiment of a wireless communication system for handling collisions between multiple semi-persistent grants in accordance with various aspects as described herein.

For example, FIG. 2 illustrates one embodiment of a wireless communication system 200 for handling collisions between multiple semi-persistent grants in accordance with various aspects as described herein. In FIG. 2, a network node 201 (e.g., eNB) having a coverage area 203 may determine to enable SPS of radio resources (e.g., time and frequency resources) for wireless communications between the network node 201 and a wireless device 211 (e.g., UE). Further, the network node 201 may transmit, to the wireless device 211, an indication to enable the wireless device 211 for semi-persistent scheduling of radio resources. In response to receiving this indication, the wireless device 211 may enable itself for semi-persistent scheduling of radio resources. In addition, the network node 201 may determine a selection criteria 207 by which both the network node 201 and the wireless device 211 select one of multiple activated semi-persistent configurations 233, 243 assigned to the wireless device 211 responsive to determining that the multiple configurations 233, 243 have granted the same radio resource on the same wireless communications channel 231. In one example, the network node 201 may include a selection criteria obtainer circuit 205 to receive, determine, or obtain the selection criteria 207.

The selection criteria 207 may be based on an index that identifies each configuration 233, 243, a size of the grant of radio resources for each configuration 233, 243, a priority of each configuration 233, 243, the like, or any combination thereof. In one example, the network node 201 and the wireless device 211 may select the configuration 233, 243 that has the lowest or highest value of the index that identifies each configuration 233, 243. In another example, the network node 201 and the wireless device 211 may select the configuration 233, 243 that has the lowest or highest value of an sps-ConfigIndex parameter that is used to identify each multiple configuration 233, 243. In yet another example, the network node 201 and the wireless device 211 may select the configuration 233, 243 that has the largest size of the grant of radio resources. In yet another example, the network node 201 and the wireless device 211 may select the configuration 233, 243 that has the highest priority or is prioritized over the other configuration(s). The multiple configurations 233, 243 may have different periodicities, patterns, sequences, the like, or any combination thereof. In one example as shown in FIG. 2, the first configuration 233 has a periodicity 235 that is greater than a periodicity 245 of the second configuration 243. Further, each configurations 233, 243 may have a different type of data traffic.

In FIG. 2, the network node 201 may transmit, to the wireless device 211, the selection criteria 207. The wireless device 211 may receive, from the network node 201, the selection criteria 207. In one example, the wireless device 211 may include a selection criteria obtainer circuit 215 to receive, determine, or obtain the selection criteria 207. During operation, the wireless device 211 obtains (such as from local memory) the selection criteria 207 responsive to determining that the multiple configurations 233, 243 have granted the same radio resource 247. Further, the wireless device 211 selects one of the multiple configurations 233, 243 based on the selection criteria 207. Also, the wireless device 211 transmits or receives on that radio resource 247 in accordance with the selected configuration. Similarly, the network node 201 obtains the selection criteria 207 responsive to determining that the multiple configurations 233, 243 have granted the same radio resource 247. Further, the network node 201 selects one of the multiple configurations 233, 243 based on the selection criteria 207. The network node 201 also transmits or receives on that radio resource 247 in accordance with the selected configuration.

Additionally or alternatively, the network node 201 may be configured to support a wireless communication system (e.g., NR, LTE, LTE-NR, 5G, UMTS, GSM, or the like). Further, the network node 201 may be a base station (e.g., eNB), an access point, a wireless router, or the like. The network node 201 may serve wireless devices such as wireless device 211. The wireless device 211 may be configured to support a wireless communication system (e.g., NR, LTE, LTE-NR, 5G, UMTS, GSM, or the like). The wireless device 211 may be a UE, a mobile station (MS), a terminal, a cellular phone, a cellular handset, a personal digital assistant (PDA), a smartphone, a wireless phone, an organizer, a handheld computer, a desktop computer, a laptop computer, a tablet computer, a set-top box, a television, an appliance, a game device, a medical device, a display device, a metering device, or the like.

Figure 3:
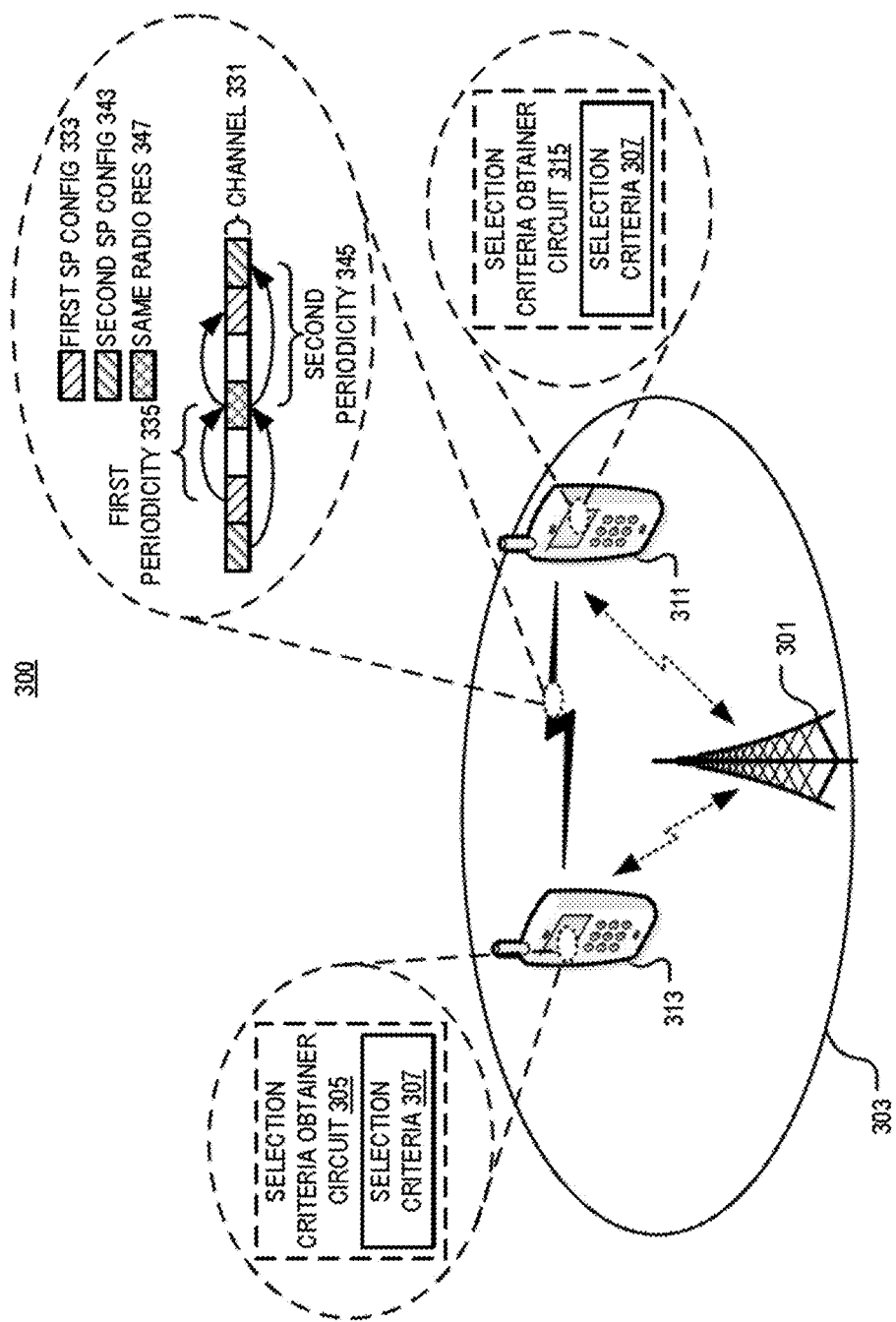
FIG. 3 illustrates another embodiment of a wireless communication system for handling collisions between multiple semi-persistent grants in accordance with various aspects as described herein.

FIG. 3 illustrates another embodiment of a wireless communication system 300 for handling collisions between multiple semi-persistent grants in accordance with various aspects as described herein. In FIG. 3, a network node 301 (e.g., eNB) having a coverage area 303 may wirelessly communicate with first and second wireless devices 311, 313 (e.g., UEs). The second wireless device 313 may determine to enable SPS of radio resources (e.g., time and frequency resources) for wireless communications between the first and second wireless devices 311, 313. Further, the second wireless device 313 may transmit, to the first wireless device 311, an indication to enable the first wireless device 311 for semi-persistent scheduling of radio resources. In response to receiving this indication, the first wireless device 311 may enable itself for semi-persistent scheduling of radio resources. In addition, the second wireless device 313 may determine a selection criteria 307 by which both the second wireless device 313 and the first wireless device 311 select one of multiple activated semi-persistent configurations 333, 343 assigned to the first wireless device 311 responsive to determining that the multiple configurations 333, 343 have granted the same radio resource 347 on the same wireless communications channel 331. In one example, the second wireless device 313 may include a selection criteria obtainer circuit 305 to receive, determine, or obtain the selection criteria 307.

The selection criteria 307 may be based on an index that identifies each configuration 333, 343, a size of the grant of radio resources for each configuration 333, 343, a priority of each configuration 333, 343, the like, or any combination thereof. In one example, the second wireless device 313 and the first wireless device 311 may select the configuration 333, 343 that has the lowest or highest value of the index that identifies each configuration 333, 343. In another example, the first wireless device 311 and the second wireless device 313 may select the configuration 333, 343 that has the lowest or highest value of an sps-ConfigIndex parameter that is used to identify each multiple configuration 333, 343. In yet another example, the second wireless device 313 and the first wireless device 311 may select the configuration 333, 343 that has the largest size of the grant of radio resources. In yet another example, the second wireless device 313 and the first wireless device 311 may select the configuration 333, 343 that has the highest priority or is prioritized over the other configuration(s). The multiple configurations 333, 343 may have different periodicities, patterns, sequences, the like, or any combination thereof. In one example as shown in FIG. 3, the first configuration 333 has a periodicity 335 that is greater than a periodicity 345 of the second configuration 343. Further, each configurations 333, 343 may have a different type of data traffic.

In FIG. 3, the second wireless device 313 may transmit, to the first wireless device 311, the selection criteria 307. The first wireless device 311 may receive, from the second wireless device 313, the selection criteria 307. In one example, the first and second wireless devices 311, 313 may include respective selection criteria obtainer circuits 315, 305 to receive, determine, or obtain the selection criteria 307. During operation, the first wireless device 311 obtains (such as from local memory) the selection criteria 307 responsive to determining that the multiple configurations 333, 343 have granted the same radio resource 347. Further, the first wireless device 311 selects one of the multiple configurations 333, 343 based on the selection criteria 307. Also, the first wireless device 311 transmits or receives on that radio resource 345 in accordance with the selected configuration. Similarly, the second wireless device 313 obtains the selection criteria 307 responsive to determining that the multiple configurations 333, 343 have granted the same radio resource 347. Further, the second wireless device 313 selects one of the multiple configurations 333, 343 based on the selection criteria 307. The second wireless device 313 also transmits or receives on that radio resource 345 in accordance with the selected configuration.

Additionally or alternatively, the network node 301 may be configured to support a wireless communication system (e.g., NR, LTE, LTE-NR, 5G, UMTS, GSM, or the like). Further, the network node 301 may be a base station (e.g., eNB), an access point, a wireless router, or the like. The network node 301 may serve wireless devices such as wireless devices 311, 313. Each wireless device 311, 313 may be configured to support a wireless communication system (e.g., NR, LTE, LTE-NR, 5G, UMTS, GSM, or the like). Further, each wireless device 311, 313 may be a UE, an MS, a terminal, a cellular phone, a cellular handset, a PDA, a smartphone, a wireless phone, an organizer, a handheld computer, a desktop computer, a laptop computer, a tablet computer, a set-top box, a television, an appliance, a game device, a medical device, a display device, a metering device, or the like.

Figure 4:
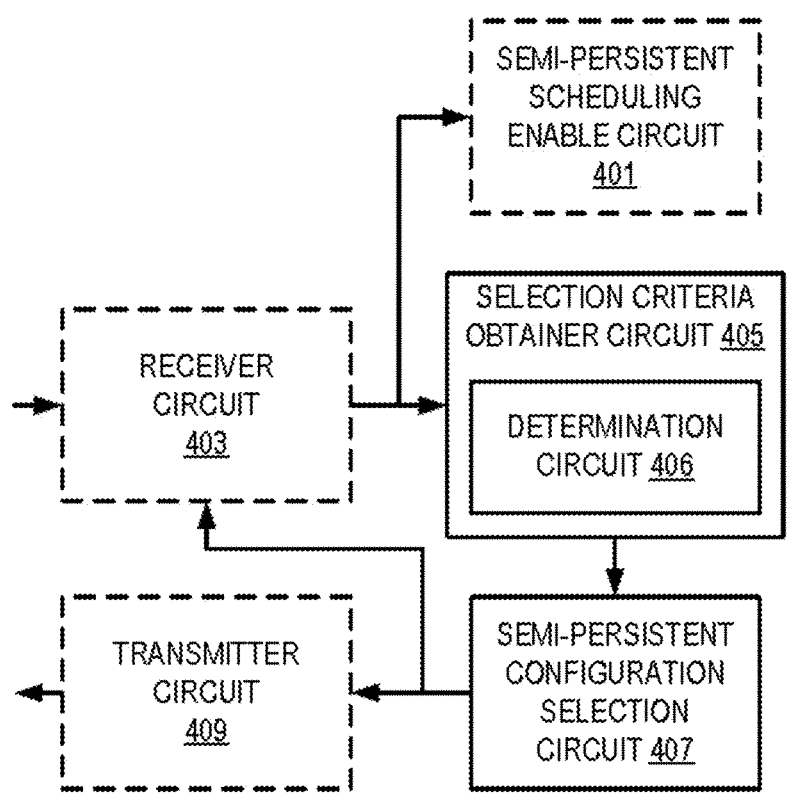
FIG. 4 illustrates one embodiment of a wireless device in accordance with various aspects as described herein.

FIG. 4 illustrates one embodiment of a wireless device 400 in accordance with various aspects as described herein. In FIG. 4, the wireless device 400 may include a semi-persistent scheduling enable circuit 401, a receiver circuit 403, a selection criteria obtainer circuit 405, a semi-persistent configuration selection circuit 407, a transmitter circuit 409, the like, or any combination thereof. The receiver circuit 403 may be configured to receive, from a network node or another wireless device, an indication to enable the wireless device 400 for semi-persistent scheduling of radio resources. In response to the enable indication, the semi-persistent scheduling enable circuit 403 may be configured to enable semi-persistent scheduling of radio resources for wireless communications between the wireless device 400 and the network node or the other wireless device.

In FIG. 4, the selection criteria obtainer circuit 405 may include a determination circuit 406 that is configured to determine that multiple activated SPS configurations assigned to the wireless device 400 have granted a same radio resource. The same radio resource may be a radio resource in the same TTI or in the same subframe. Also, the receiver circuit 401 may be further configured to receive, from the network node or the other wireless device, an indication of a selection criteria by which both the wireless device 400 and the network node or the other wireless device selects one of multiple activated semi-persistent configurations assigned to the wireless device 400. In response to determining that the multiple configurations have granted the same radio resource, the selection criteria obtainer circuit 405 is configured to obtain the selection criteria. The semi-persistent configuration selection circuit 407 is configured to select one of the multiple configurations based on the selection criteria. Finally, the transmitter circuit 409 or the receiver circuit 401 is further configured to respectively transmit or receive on that radio resource in accordance with the selected configuration.

Figure 5A:
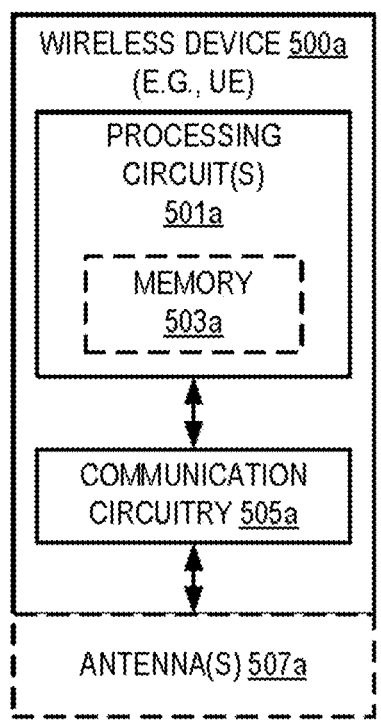
FIGS. 5A-B illustrate other embodiments of a wireless device in accordance with various aspects as described herein.
Figure 5B:
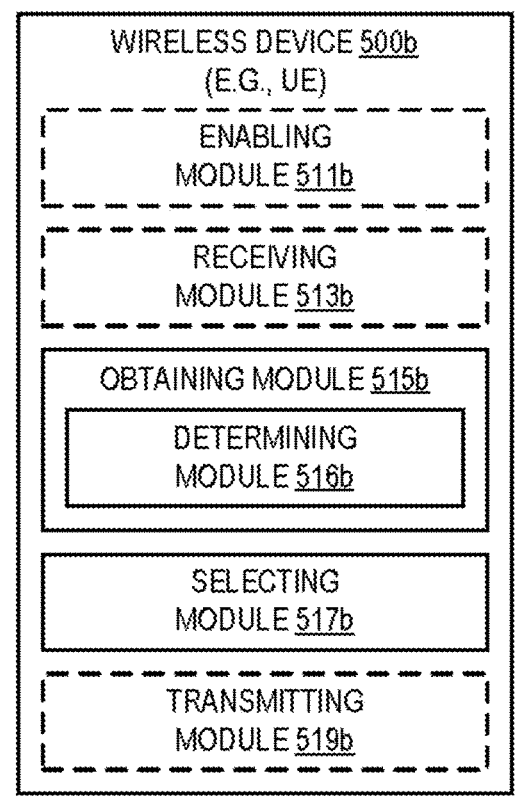

FIGS. 5A-B illustrate other embodiments of a wireless device 500a-b in accordance with various aspects as described herein. In FIG. 5A, the wireless device 500a (e.g., UE) may include processing circuit(s) 501a, radio frequency (RF) communications circuit(s) 505a, antenna(s) 507a, the like, or any combination thereof. The communication circuit(s) 505a may be configured to transmit or receive information to or from one or more network nodes or one or more wireless devices via any communication technology. This communication may occur using the one or more antennas 507a that are either internal or external to the wireless device 500a. The processing circuit(s) 501a may be configured to perform processing as described herein (e.g., the methods of FIGS. 6, 9, 20) such as by executing program instructions stored in memory 503a. The processing circuit(s) 501a in this regard may implement certain functional means, units, or modules.

In FIG. 5B, the wireless device 500b may implement various functional means, units, or modules (e.g., via the processing circuit(s) 501a in FIG. 5A or via software code). These functional means, units, or modules (e.g., for implementing the methods of FIGS. 6, 9, 20) may include a receiving module or unit 513b for receiving, from a network node or another wireless device, an indication to enable the wireless device 500b for semi-persistent scheduling of radio resources. Further, these functional means, units, or modules may include an enabling module or unit 511b for enabling the wireless device 500b for semi-persistent scheduling of radio resources responsive to determining to enable for the semi-persistent scheduling.

Furthermore, these functional means, units, or modules may include a determining module or unit 516b for determining that multiple activated SPS configurations assigned to the wireless device 500b have granted a same radio resource. Further, the same radio resource may be a radio resource in the same TTI or in the same subframe. Also, the receiving module or unit 513b may include receiving, from the network node or the other wireless device, an indication of a selection criteria by which both the wireless device 500b and the network node or the other wireless device selects one of multiple activated semi-persistent configurations assigned to the wireless device 500b responsive to determining that the multiple configurations have granted the same radio resource. These functional means, units, or modules include an obtaining module or unit 515b for obtaining the selection criteria responsive to determining that the multiple configurations have granted the same radio resource. These functional means, units, or modules include a selecting module or unit 517b for selecting one of the multiple configurations based on the selection criteria. Finally, the transmitting module or unit 519b or the receiving module or unit 513b may include transmitting or receiving on that radio resource in accordance with the selected configuration.

Figure 6:
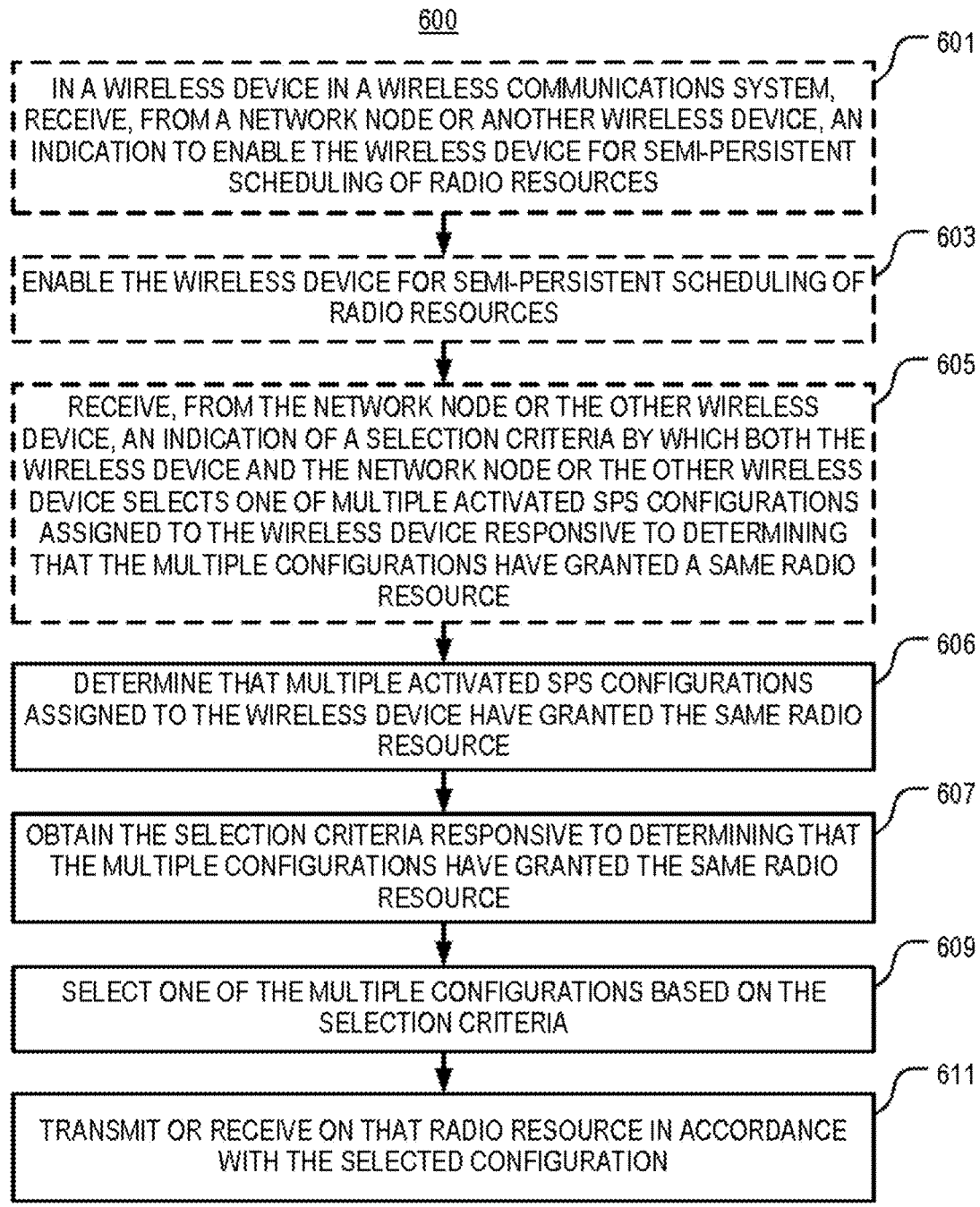
FIG. 6 illustrates one embodiment of a method performed by a wireless device for handling collisions between multiple semi-persistent grants in a wireless communication system in accordance with various aspects as described herein.

FIG. 6 illustrates one embodiment of a method 600 performed by a wireless device for handling collisions between multiple semi-persistent grants in a wireless communication system in accordance with various aspects as described herein. The wireless device performing this method 600 may correspond to any of the wireless devices 211, 311, 400, 500a-b, 700, 800a-b, 1000, 1411, 2200 described herein. In FIG. 6, the method 600 may start, for instance, at block 601 where it may include receiving, from a network node or another wireless device, an indication to enable the wireless device for semi-persistent scheduling of radio resources. The method 600 may include determining to enable semi-persistent scheduling of radio resources for wireless communications between the wireless device and the network node or the other wireless device. In response, the method 600 may include enabling the wireless device for semi-persistent scheduling of radio resources, as represented by block 603.

In FIG. 6, the method 600 may include receiving, from the network node or the other wireless device, an indication of a selection criteria by which both the wireless device and the network node or the other wireless device selects one of multiple activated SPS configurations assigned to the wireless device responsive to determining that the multiple configurations have granted a same radio resource, as represented by block 605. Further, the same radio resource may be a radio resource in the same TTI or in the same subframe. At block 606, the method 600 may include determining that multiple activated SPS configurations assigned to the wireless device have granted the same radio resource. In response to determining that the multiple configurations have granted the same radio resource, the method 600 includes obtaining the selection criteria, as represented by block 607. At block 609, the method 600 includes selecting one of the multiple configurations based on the selection criteria. At block 611, the method 600 includes transmitting or receiving on that radio resource in accordance with the selected configuration.

Figure 7:
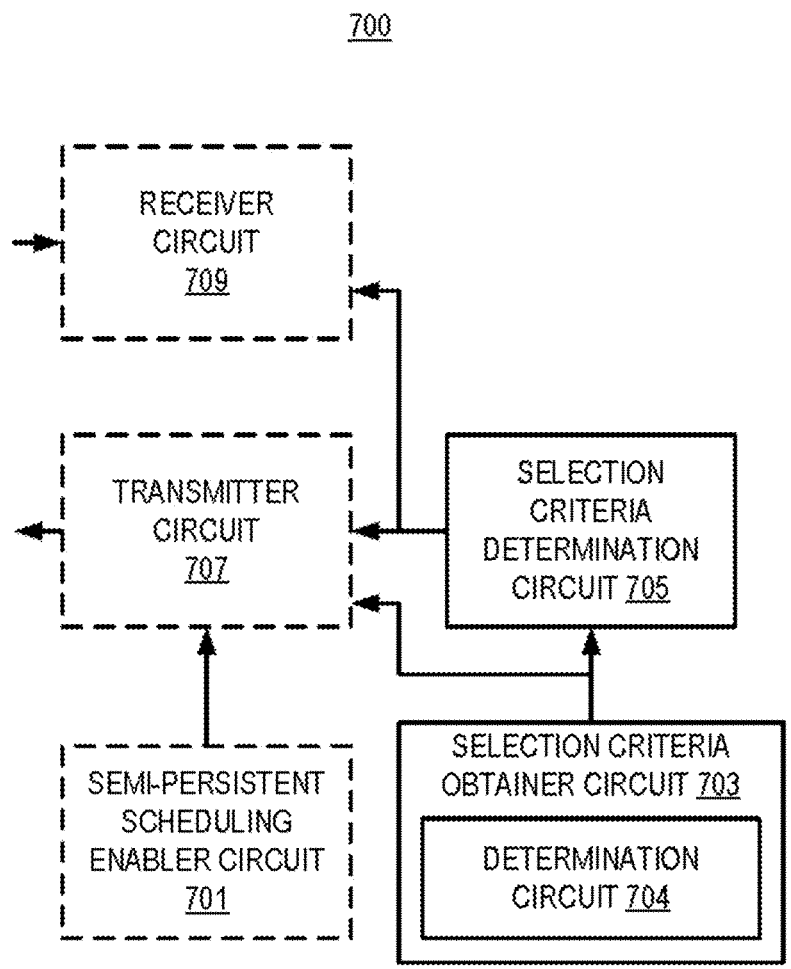
FIG. 7 illustrates another embodiment of a wireless device in accordance with various aspects as described herein.

FIG. 7 illustrates another embodiment of a wireless device 700 in accordance with various aspects as described herein. In FIG. 7, the wireless device 700 may include a semi-persistent scheduling enable circuit 701, a selection criteria obtainer circuit 703, a selection criteria determination circuit 705, a transmitter circuit 707, a receiver circuit 709, the like, or any configuration thereof. The semi-persistent scheduling enable circuit 701 may be configured to determine to enable semi-persistent scheduling of radio resources for wireless communications between the wireless device 700 and another wireless device. The transmitter circuit 707 may be configured to transmit, to the other wireless device, an indication to enable semi-persistent scheduling of radio resources. The selection criteria determination circuit 705 is configured to determine a selection criteria by which both the wireless device 700 and the other wireless device select one of multiple activated semi-persistent configurations assigned to the wireless device 700. The transmitter circuit 707 is further configured to transmit, to the other wireless device, an indication of the selection criteria. The selection criteria obtainer circuit 703 may include a determination circuit 704 that is configured to determine that multiple activated SPS configurations assigned to the wireless device 700 have granted a same radio resource. Further, the same radio resource may be a radio resource in the same TTI or in the same subframe. In response to determining that the multiple configurations have granted the same radio resource, the selection criteria obtainer circuit 703 may be configured to obtain the selection criteria. Further, the selection criteria determination circuit 705 may be configured to select one of the multiple configurations based on the selection criteria. Finally, the transmitter circuit 707 or the receiver circuit 709 may be configured to transmit or receive, to or from the other wireless device, on that radio resource in accordance with the selected configuration FIGS. 8A-B illustrate other embodiments of a wireless device 800*a-b* in accordance with various aspects as described herein. In FIG. 8A, the wireless device 800*a* (e.g., UE) may include processing circuit(s) 801*a*, radio frequency (RF) communications circuit(s) 805*a*, antenna(s) 807*a*, the like, or any combination thereof. The communication circuit(s) 805*a* may be configured to transmit or receive information to or from one or more network nodes or one or more wireless devices via any communication technology. This communication may occur using the one or more antennas 807*a* that are either internal or external to the wireless device 800*a*. The processing circuit(s) 801*a* may be configured to perform processing as described herein (e.g., the method of FIGS. 6, 9) such as by executing program instructions stored in memory 803*a*. The processing circuit(s) 801*a* in this regard may implement certain functional means, units, or modules.

In FIG. 8B, the wireless device 800*b* may implement various functional means, units, or modules (e.g., via the processing circuit(s) 801*a* in FIG. 8A or via software code). These functional means, units, or modules (e.g., for implementing the method of FIGS. 6, 9) may include an enabling module or unit 811*b* for enabling semi-persistent scheduling of radio resources for wireless communications between the wireless device 800*b* and another wireless device responsive to determining to enable the semipersistent scheduling. Further, these functional means, units, or modules may include a transmitter module or unit 817*b* for transmitting, to the other wireless device, an indication to enable semi-persistent scheduling of radio resources. These functional means, units, or modules include a selection criteria determining module or unit 812*b* for determining a selection criteria by which both the wireless device 800*b* and the other wireless device select one of multiple activated semi-persistent configurations assigned to the wireless device 800*b*. The transmitting module or unit 817*b* also includes transmitting, to the other wireless device, an indication of the selection criteria.

Furthermore, these functional means, units, or modules may include a determining module or unit 814*b* for determining that multiple activated SPS configurations assigned to the wireless device 800*b* have granted a same radio resource. Further, the same radio resource may be a radio resource in the same TTI or in the same subframe. In addition, these functional means, units, or modules may include an obtaining module or unit 813*b* for obtaining the selection criteria responsive to determining that the multiple configurations have granted the same radio resource. These functional means, units, or modules may include a selecting module or unit 815*b* for selecting one of the multiple configurations based on the selection criteria. Finally, these functional means, units, or modules may include a receiving module or unit 819*b* for receiving, from the other wireless device, on that radio resource in accordance with the selected configuration. Additionally or alternatively, the transmitting module or unit 817*b* may include transmitting, to the other wireless device, on that radio resource in accordance with the selected configuration.

Figure 9:
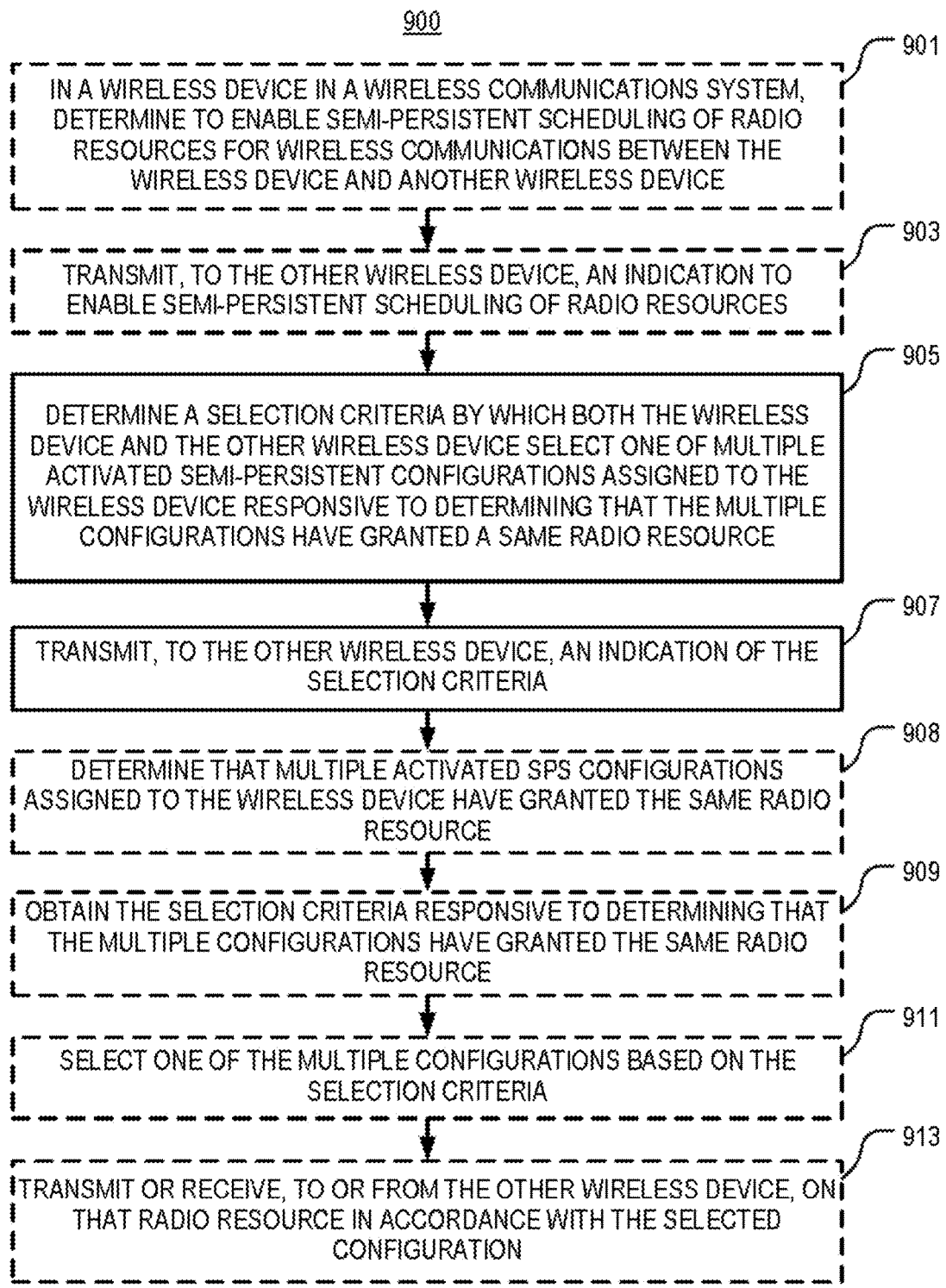
FIG. 9 illustrates another embodiment of a method performed by a wireless device for handling collisions between multiple semi-persistent grants in a wireless communication system in accordance with various aspects as described herein.

FIG. 9 illustrates another embodiment of a method 900 performed by a wireless device for handling collisions between multiple semi-persistent grants in a wireless communication system in accordance with various aspects as described herein. The wireless device performing this method 900 may correspond to any of the wireless devices 211, 311, 400, 500*a-b*, 700, 800*a-b*, 1000, 1411, 2200 described herein. In FIG. 9, the method 900 may start, for instance, at block 901 where it may include determining to enable semi-persistent scheduling of radio resources for wireless communications between the wireless device and another wireless device. At block 903, the method 900 may include transmitting, to the other wireless device, an indication for the other wireless device to enable semi-persistent scheduling of radio resources. At block 905, the method 900 may include determining a selection criteria by which both the wireless device and the other wireless device select one of multiple activated semi-persistent configurations assigned to the wireless device responsive to determining that the multiple configurations have granted the same radio resource. At block 907, the method 900 includes transmitting, to the other wireless device, an indication of the selection criteria.

In FIG. 9, the method 900 includes determining that the multiple configurations have granted a same radio resource, as represented at block 908. Further, the same radio resource may be a radio resource in the same TTI or in the same subframe. In response to determining that the multiple configurations have granted the same radio resource, the method 900 includes obtaining the selection criteria, represented by block 909. At block 911, the method 900 may include selecting one of the multiple configurations based on the selection criteria. At block 913, the method 900 may include transmitting or receiving, to or from the other wireless device, on that radio resource in accordance with the selected configuration.

Figure 10:
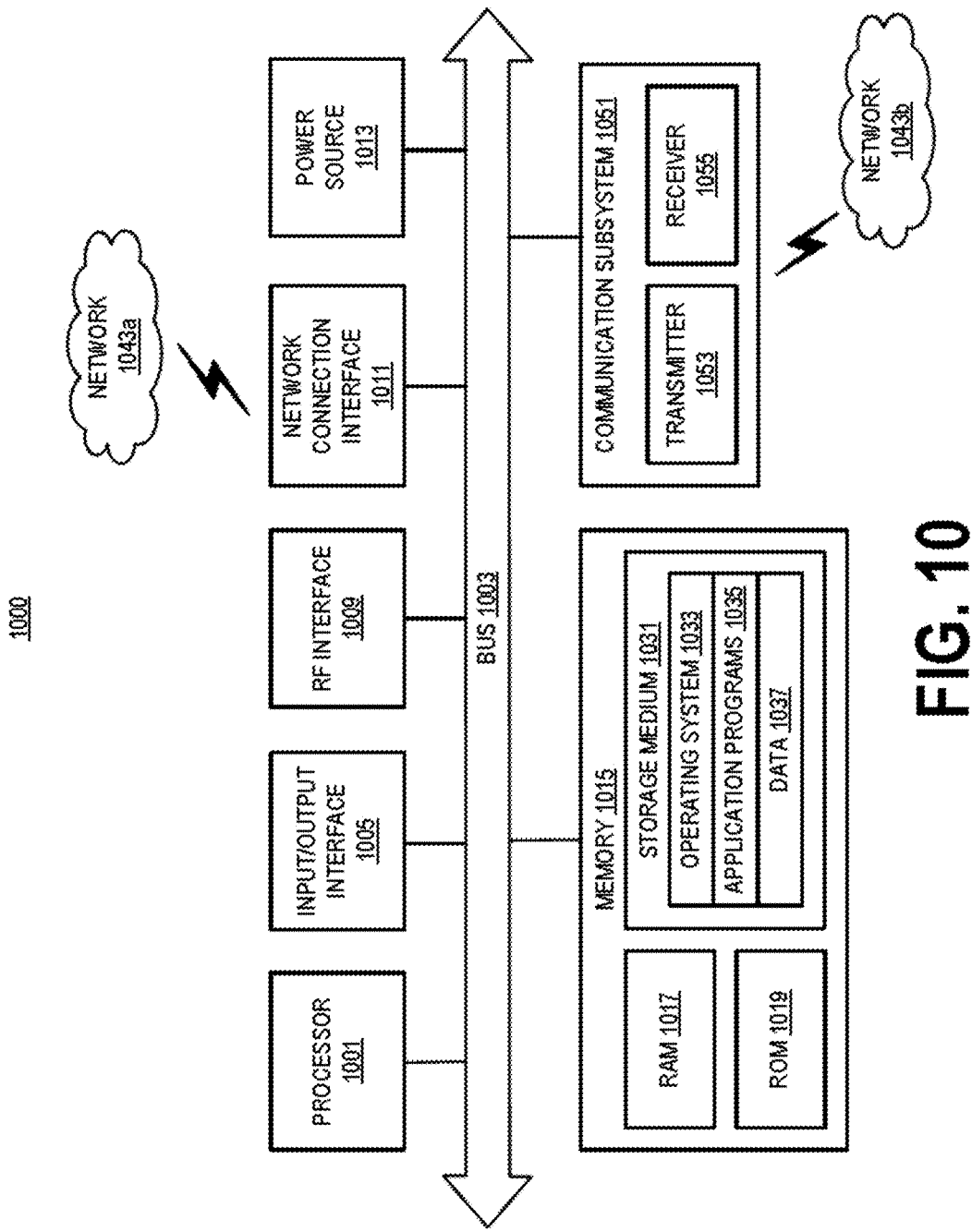
FIG. 10 illustrates another embodiment of a wireless device in accordance with various aspects as described herein.

FIG. 10 illustrates another embodiment of a wireless device 1000 in accordance with various aspects as described herein. FIG. 10 illustrates another embodiment of a wireless device in accordance with various aspects as described herein. In some instances, the wireless device 1000 may be referred as a UE, a mobile station (MS), a terminal, a cellular phone, a cellular handset, a personal digital assistant (PDA), a smartphone, a wireless phone, an organizer, a handheld computer, a desktop computer, a laptop computer, a tablet computer, a set-top box, a television, an appliance, a game device, a medical device, a display device, a metering device, or some other like terminology. In other instances, the wireless device 1000 may be a set of hardware components. In FIG. 10, the wireless device 1000 may be configured to include a processor 1001 that is operatively coupled to an input/output interface 1005, a radio frequency (RF)

interface 1009, a network connection interface 1011, a memory 1015 including a random access memory (RAM) 1017, a read only memory (ROM) 1019, a storage medium 1031 or the like, a communication subsystem 1051, a power source 1033, another component, or any combination thereof. The storage medium 1031 may include an operating system 1033, an application program 1035, data 1037, or the like. Specific devices may utilize all of the components shown in FIG. 10, or only a subset of the components, and levels of integration may vary from device to device. Further, specific devices may contain multiple instances of a component, such as multiple processors, memories, transceivers, transmitters, receivers, etc. For instance, a computing device may be configured to include a processor and a memory.

In FIG. 10, the processor 1001 may be configured to process computer instructions and data. The processor 1001 may be configured as any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored-program, general-purpose processors, such as a microprocessor or Digital Signal Processor (DSP), together with appropriate software; or any combination of the above. For example, the processor 1001 may include two computer processors. In one definition, data is information in a form suitable for use by a computer. It is important to note that a person having ordinary skill in the art will recognize that the subject matter of this disclosure may be implemented using various operating systems or combinations of operating systems.

In the current embodiment, the input/output interface 1005 may be configured to provide a communication interface to an input device, output device, or input and output device. The wireless device 1000 may be configured to use an output device via the input/output interface 1005. A person of ordinary skill will recognize that an output device may use the same type of interface port as an input device. For example, a USB port may be used to provide input to and output from the wireless device 1000. The output device may be a speaker, a sound card, a video card, a display, a monitor, a printer, an actuator, an emitter, a smartcard, another output device, or any combination thereof. The wireless device 1000 may be configured to use an input device via the input/output interface 1005 to allow a user to capture information into the wireless device 1000. The input device may include a mouse, a trackball, a directional pad, a trackpad, a presence-sensitive input device, a display such as a presence-sensitive display, a scroll wheel, a digital camera, a digital video camera, a web camera, a microphone, a sensor, a smartcard, and the like. The presence-sensitive input device may include a digital camera, a digital video camera, a web camera, a microphone, a sensor, or the like to sense input from a user. The presence-sensitive input device may be combined with the display to form a presence-sensitive display. Further, the presence-sensitive input device may be coupled to the processor. The sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 10, the RF interface 1009 may be configured to provide a communication interface to RF components such as a transmitter, a receiver, and an antenna. The network connection interface 1011 may be configured to provide a communication interface to a network 1043$a$. The network 1043$a$ may encompass wired and wireless communication networks such as a local-area network (LAN), a wide-area network (WAN), a computer network, a wireless network, a telecommunications network, another like network or any combination thereof. For example, the network 1043$a$ may be a W-Fi network. The network connection interface 1011 may be configured to include a receiver and a transmitter interface used to communicate with one or more other nodes over a communication network according to one or more communication protocols known in the art or that may be developed, such as Ethernet, TCP/IP, SONET, ATM, or the like. The network connection interface 1011 may implement receiver and transmitter functionality appropriate to the communication network links (e.g., optical, electrical, and the like). The transmitter and receiver functions may share circuit components, software or firmware, or alternatively may be implemented separately.

In this embodiment, the RAM 1017 may be configured to interface via the bus 1003 to the processor 1001 to provide storage or caching of data or computer instructions during the execution of software programs such as the operating system, application programs, and device drivers. In one example, the wireless device 1000 may include at least one hundred and twenty-eight megabytes (128 Mbytes) of RAM. The ROM 1019 may be configured to provide computer instructions or data to the processor 1001. For example, the ROM 1019 may be configured to be invariant low-level system code or data for basic system functions such as basic input and output (I/O), startup, or reception of keystrokes from a keyboard that are stored in a non-volatile memory. The storage medium 1031 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives. In one example, the storage medium 1031 may be configured to include an operating system 1033, an application program 1035 such as a web browser application, a widget or gadget engine or another application, and a data file 1037.

In FIG. 10, the processor 1001 may be configured to communicate with a network 1043$b$ using the communication subsystem 1051. The network 1043$a$ and the network 1043$b$ may be the same network or networks or different network or networks. The communication subsystem 1051 may be configured to include one or more transceivers used to communicate with the network 1043$b$. The one or more transceivers may be used to communicate with one or more remote transceivers of another wireless device such as a base station of a radio access network (RAN) according to one or more communication protocols known in the art or that may be developed, such as IEEE 802.xx, CDMA, WCDMA, GSM, LTE, New Radio (NR), NB IoT, UTRAN, WiMax, or the like.

In another example, the communication subsystem 1051 may be configured to include one or more transceivers used to communicate with one or more remote transceivers of another wireless device such as user equipment according to one or more communication protocols known in the art or that may be developed, such as IEEE 802.xx, CDMA, WCDMA, GSM, LTE, NR, NB IoT, UTRAN, WiMax, or the like. Each transceiver may include a transmitter 1053 or a receiver 1055 to implement transmitter or receiver functionality, respectively, appropriate to the RAN links (e.g., frequency allocations and the like). Further, the transmitter 1053 and the receiver 1055 of each transceiver may share circuit components, software, or firmware, or alternatively may be implemented separately.

In the current embodiment, the communication functions of the communication subsystem 1051 may include data communication, voice communication, multimedia communication, short-range communications such as Bluetooth, near-field communication, location-based communication such as the use of the global positioning system (GPS) to determine a location, another like communication function, or any combination thereof. For example, the communication subsystem 1051 may include cellular communication, Wi-Fi communication, Bluetooth communication, and GPS communication. The network 1043*b* may encompass wired and wireless communication networks such as a local-area network (LAN), a wide-area network (WAN), a computer network, a wireless network, a telecommunications network, another like network or any combination thereof. For example, the network 1043*b* may be a cellular network, a Wi-Fi network, and a near-field network. The power source 1013 may be configured to provide an alternating current (AC) or direct current (DC) power to components of the wireless device 1000.

In FIG. 10, the storage medium 1031 may be configured to include a number of physical drive units, such as a redundant array of independent disks (RAID), a floppy disk drive, a flash memory, a USB flash drive, an external hard disk drive, thumb drive, pen drive, key drive, a high-density digital versatile disc (HD-DVD) optical disc drive, an internal hard disk drive, a Blu-Ray optical disc drive, a holographic digital data storage (HDDS) optical disc drive, an external mini-dual in-line memory module (DIMM) synchronous dynamic random access memory (SDRAM), an external micro-DIMM SDRAM, a smartcard memory such as a subscriber identity module or a removable user identity (SIM/RUIM) module, other memory, or any combination thereof. The storage medium 1031 may allow the wireless device 1000 to access computer-executable instructions, application programs or the like, stored on transitory or non-transitory memory media, to off-load data, or to upload data. An article of manufacture, such as one utilizing a communication system may be tangibly embodied in storage medium 1031, which may comprise a computer-readable medium.

The functionality of the methods described herein may be implemented in one of the components of the wireless device 1000 or partitioned across multiple components of the wireless device 1000. Further, the functionality of the methods described herein may be implemented in any combination of hardware, software, or firmware. In one example, the communication subsystem 1051 may be configured to include any of the components described herein. Further, the processor 1001 may be configured to communicate with any of such components over the bus 1003. In another example, any of such components may be represented by program instructions stored in memory that when executed by the processor 1001 performs the corresponding functions described herein. In another example, the functionality of any of such components may be partitioned between the processor 1001 and the communication subsystem 1051. In another example, the non-computative-intensive functions of any of such components may be implemented in software or firmware and the computative-intensive functions may be implemented in hardware.

Figure 11:
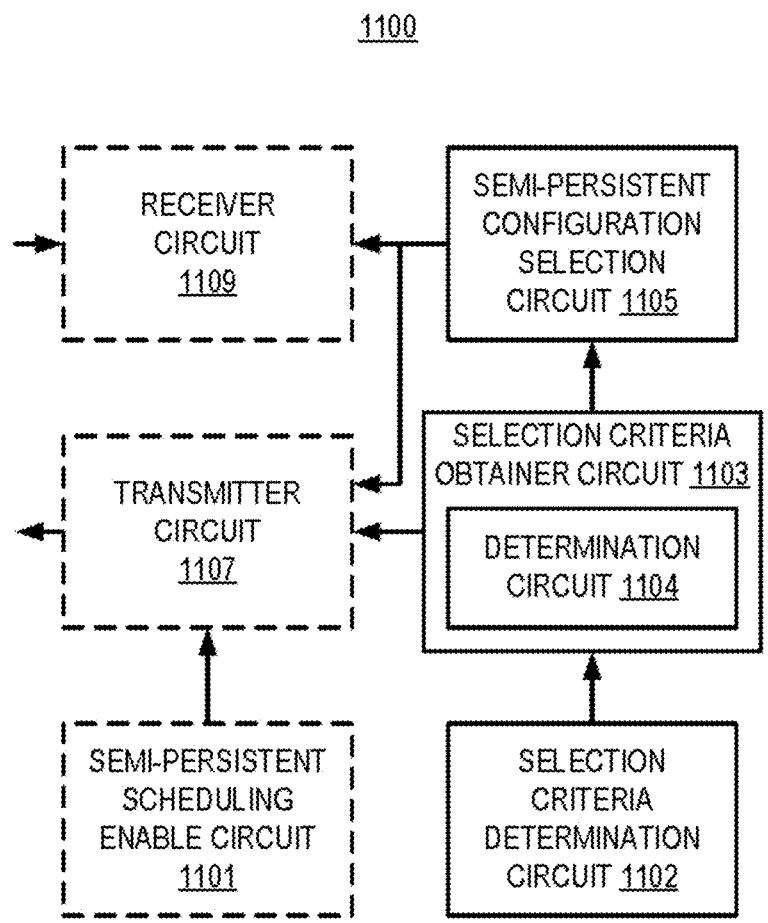
FIG. 11 illustrates one embodiment of a network node in accordance with various aspects as described herein.

FIG. 11 illustrates one embodiment of a network node 1100 in accordance with various aspects as described herein.

The network node 1100 may include a semi-persistent scheduling enable circuit 1101, a selection criteria determination circuit 1102, a selection criteria obtainer circuit 1103, a semi-persistent configuration selection circuit 1105, a transmitter circuit 1107, a receiver circuit 1109, the like, or any combination thereof. The selection criteria enable circuit 1101 may be configured to enable semi-persistent scheduling of radio resources for wireless communications between the network node 1100 and a wireless device. The transmitter circuit 1107 may be configured to transmit, to the wireless device, an indication to enable semi-persistent scheduling of radio resources. The selection criteria determination circuit 1102 may be configured to determine selection criteria by which both the network node and the wireless device selects one of multiple activated semi-persistent configurations assigned to the wireless device responsive to determining that the multiple configurations have granted a same radio resource. Further, the same radio resource may be a radio resource in the same TTI or in the same subframe. The transmitter circuit 1107 may be further configured to transmit, to the wireless device, the selection criteria.

In FIG. 11, the selection criteria obtainer circuit 1103 may include a determination circuit 1103 that is configured to determine that multiple activated SPS configurations assigned to the wireless device have granted the same radio resource. Further, the same radio resource may be a radio resource in the same TTI or in the same subframe. In addition, the selection criteria obtainer circuit 1103 is configured to obtain the selection criteria responsive to determining that the multiple configurations have granted the same radio resource. Also, the semi-persistent configuration selection circuit 1105 is configured to select one of the multiple configurations based on the selection criteria. Finally, the transmitter circuit 1107 or the receiver circuit 1109 may be configured to transmit or receive on that radio resource in accordance with the selected configuration.

Figure 12A:
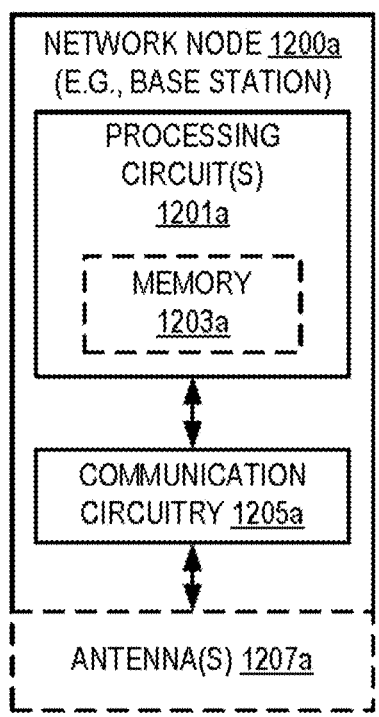
FIGS. 12A-B illustrate other embodiments of a network node in accordance with various aspects as described herein.
Figure 12B:
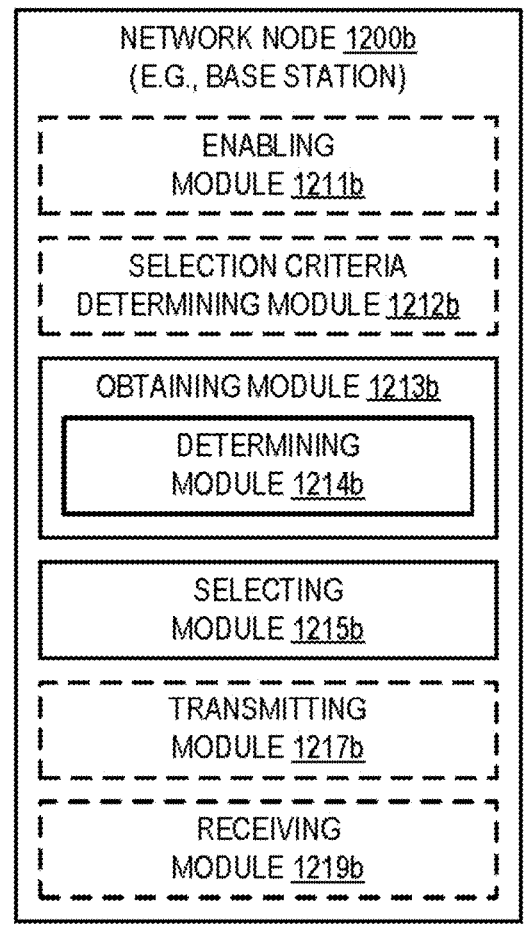

FIGS. 12A-B illustrate other embodiments of a network node 1200*a,b* in accordance with various aspects as described herein. In FIG. 12A, the network node 1200*a* (e.g., base station) may include processing circuit(s) 1201*a*, radio frequency (RF) communications circuit(s) 1205*a*, antenna(s) 1207*a*, the like, or any combination thereof. The communication circuit(s) 1205*a* may be configured to transmit or receive information to or from one or more network nodes or one or more wireless devices via any communication technology. This communication may occur using the one or more antennas 1207*a* that are either internal or external to the network node 1200*a*. The processing circuit(s) 1201*a* may be configured to perform processing as described herein (e.g., the method of FIGS. 13, 17-19) such as by executing program instructions stored in memory 1203*a*. The processing circuit(s) 1201*a* in this regard may implement certain functional means, units, or modules.

In FIG. 12B, the network node 1200*b* may implement various functional means, units, or modules (e.g., via the processing circuit(s) 1201*a* in FIG. 12A or via software code). These functional means, units, or modules (e.g., for implementing the method of FIG. 13, 17-19) may include an enabling module or unit 1211*b* for enabling semi-persistent scheduling of radio resources for wireless communications between the network node 1200*b* and a wireless device. Further, these functional means, units, or modules may include a transmitting module or unit 1217*b* for transmitting, to the wireless device, an indication to enable semi-persistent scheduling of radio resources. Also, these functional means, units, or modules may include a selection criteria determining module or unit 1212*b* for determining selection criteria by which both the network node and the wireless device selects one of multiple activated semi-persistent configurations assigned to the wireless device responsive to determining that the multiple configurations have granted a same radio resource. Further, the same radio resource may be a radio resource in the same TTI or in the same subframe. The transmitting module or unit 1217*b* may include transmitting, to the wireless device, the selection criteria.

Furthermore, these functional means, units, or modules may include a determining module or unit 1214*b* for determining that multiple activated SPS configurations assigned to the wireless device have granted the same radio resource. These functional means, units, or modules may include an obtaining module or unit 1213*b* for obtaining the selection criteria responsive to determining that the multiple configurations have granted the same radio resource. Further, these functional means, units, or modules may include a selecting module or unit 1215*b* for selecting one of the multiple configurations based on the selection criteria. Finally, these functional means, units, or modules may include a receiving module or unit 1219*b* for receiving on that radio resource in accordance with the selected configuration. Additionally or alternatively, the transmitting module or unit 1217*b* may include transmitting on that radio resource in accordance with the selected configuration.

Figure 13:
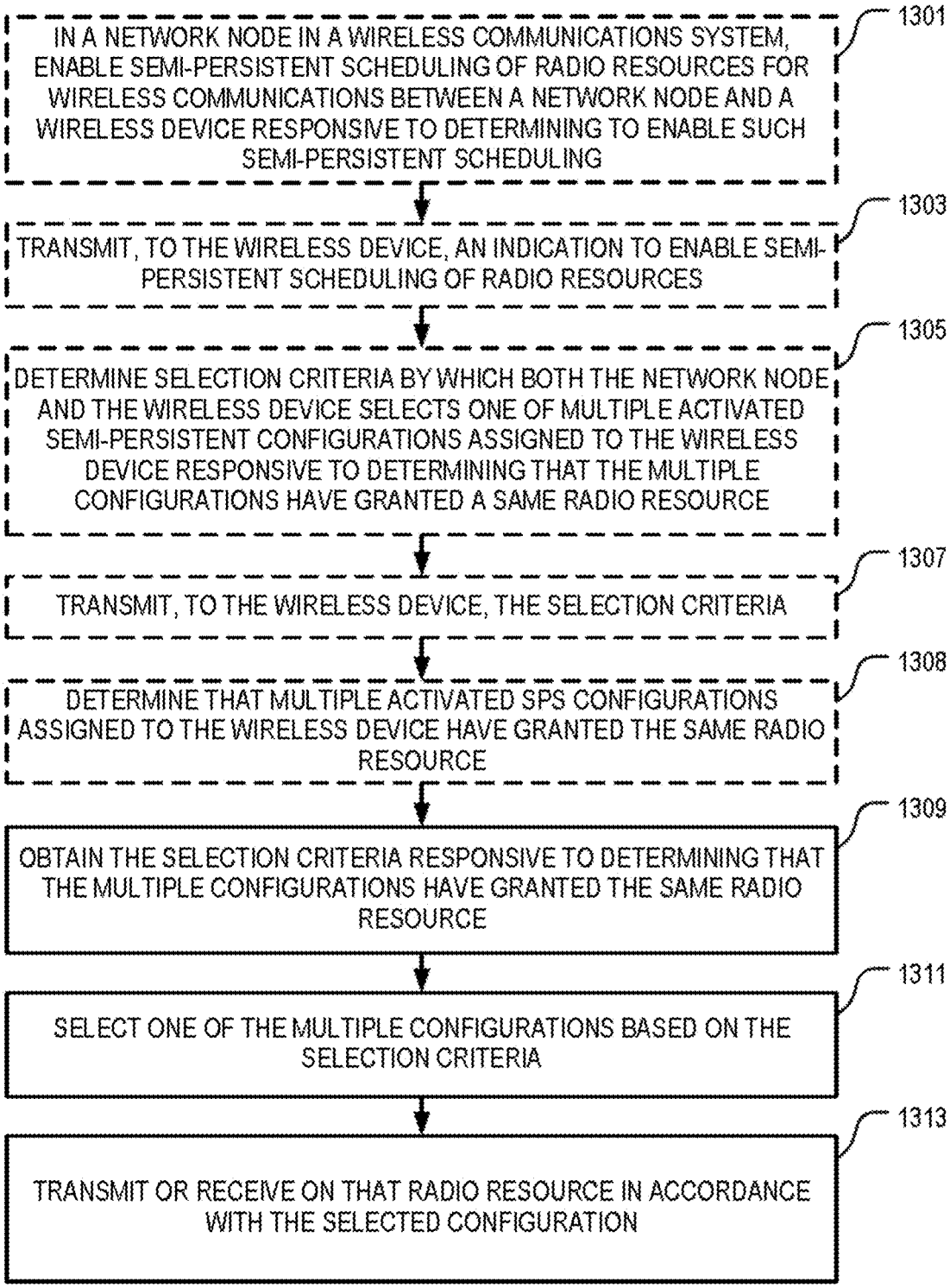
FIG. 13 illustrates one embodiment of a method performed by a network node for handling collisions between multiple semi-persistent grants in a wireless communication system in accordance with various aspects as described herein.

FIG. 13 illustrates one embodiment of a method 1300 performed by a network node for handling collisions between multiple semi-persistent grants in a wireless communication system in accordance with various aspects as described herein. The network node performing this method 1300 may correspond to any of the network nodes 201, 301, 1100, 1200*a-b*, 1401, 1500, 1600*a-b*, 2100 described herein. In FIG. 13, the method 1300 may start, for instance, at block 1301 where it may include enabling semi-persistent scheduling of radio resources for wireless communications between the network node and a wireless device responsive to determining to enable such semi-persistent scheduling. At block 1303, the method 1300 may include transmitting, to the wireless device, an indication to enable semi-persistent scheduling of radio resources. At block 1305, the method may include determining selection criteria by which both the network node and the wireless device selects one of multiple activated semi-persistent configurations assigned to the wireless device responsive to determining that the multiple configurations have granted a same radio resource. Further, the same radio resource may be a radio resource in the same TTI or in the same subframe. At block 1307, the method 1300 may include transmitting, to the wireless device, the selection criteria.

Furthermore, the method 1300 may include determining that multiple activated SPS configurations assigned to the wireless device have granted the same radio resource, as represented by block 1308. At block 1309, the method 1300 includes obtaining the selection criteria responsive to determining that the multiple configurations have granted the same radio resource. At block 1311, the method 1300 includes selecting one of the multiple configurations based on the selection criteria. At block 1313, the method 1300 includes transmitting or receiving on that radio resource in accordance with the selected configuration.

Figure 14:
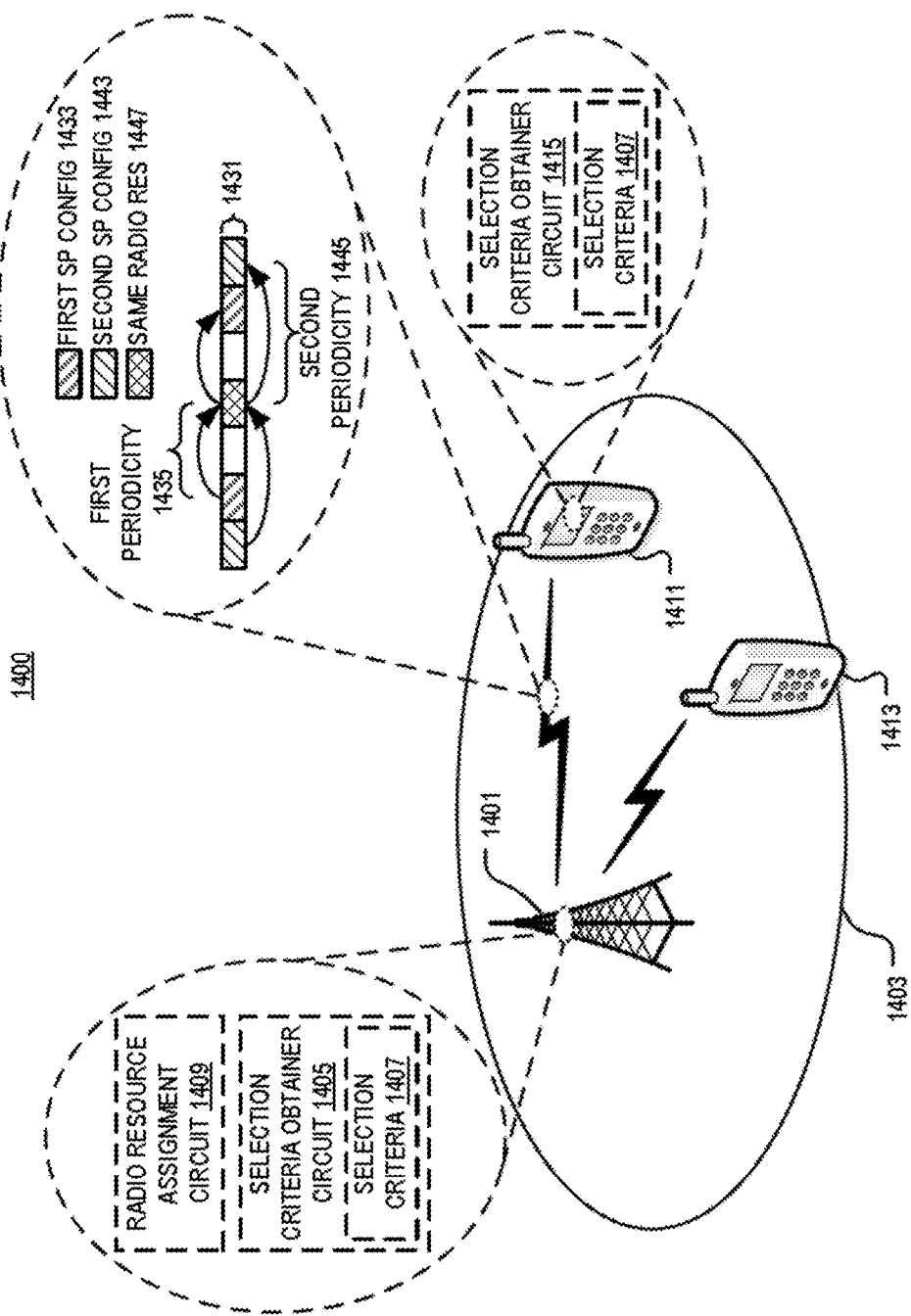
FIG. 14 illustrates one embodiment of a wireless communication system for handling collisions between multiple semi-persistent grants in accordance with various aspects as described herein.

FIG. 14 illustrates one embodiment of a wireless communication system 1400 for handling collisions between multiple semi-persistent grants in accordance with various aspects as described herein. In FIG. 14, a network node 1401 (e.g., eNB) having a coverage area 1403 may determine to enable SPS of radio resources (e.g., time and frequency resources) for wireless communications between the network node 1401 and a wireless device 1411 (e.g., UE). Further, the network node 1401 may transmit, to the wireless device 1411, an indication to enable the wireless device 1411 for semi-persistent scheduling of radio resources. In response to receiving this indication, the wireless device 1411 may enable itself for semi-persistent scheduling of radio resources. In addition, the network node 1401 may determine a selection criteria 1407 by which both the network node 1401 and the wireless device 1411 select one of multiple activated semi-persistent configurations 1433, 1443 assigned to the wireless device 1411 responsive to determining that the multiple configurations 1433, 1443 have granted a same radio resource on the same wireless communications channel 1431. Further, the same radio resource may be a radio resource in the same TTI or in the same subframe. In one example, the network node 101 may include a selection criteria obtainer circuit 1405 to receive, determine, or obtain the selection criteria 1407.

The selection criteria 1407 may be based on an index that identifies each configuration 1433, 1443, a size of the grant of radio resources for each configuration 1433, 1443, a priority of each configuration 1433, 1443, the like, or any combination thereof. In one example, the network node 1401 and the wireless device 1411 may select the configuration 1433, 1443 that has the lowest or highest value of the index that identifies each configuration 1433, 1443. In another example, the network node 1401 and the wireless device 1411 may select the configuration 1433, 1443 that has the lowest or highest value of an sps-ConfigIndex parameter that is used to identify each multiple configuration 1433, 1443. In yet another example, the network node 1401 and the wireless device 1411 may select the configuration 1433, 1443 that has the largest size of the grant of radio resources. In yet another example, the network node 1401 and the wireless device 1411 may select the configuration 1433, 1443 that has the highest priority or is prioritized over the other configuration(s). The multiple configurations 1433, 1443 may have different periodicities, patterns, sequences, the like, or any combination thereof. In one example as shown in FIG. 14, the first configuration 1433 has a periodicity 1435 that is greater than a periodicity 1445 of the second configuration 1443. Further, each configuration 1433, 1443 may have a different type of data traffic.

In FIG. 14, the network node 1401 may transmit, to the wireless device 1411, the selection criteria 1407. The wireless device 1411 may receive, from the network node 1401, the selection criteria 1407. In one example, the wireless device 1411 may include a selection criteria obtainer circuit 1415 to receive, determine, or obtain the selection criteria 1407. During operation, the wireless device 1411 may obtain (such as from local memory) the selection criteria 1407 responsive to determining that the multiple configurations 1433, 1443 have granted the same radio resource 1447. Further, the wireless device 1411 may select one of the multiple configurations 1433, 1443 based on the selection criteria 1407. Also, the wireless device 1411 may transmit or receive on that radio resource 1445 in accordance with the selected configuration.

Similarly, the network node 1401 may obtain the selection criteria 1407 responsive to determining that the multiple configurations 1433, 1443 have granted the same radio resource 1447. Further, the network node 1401 may select one of the multiple configurations 1433, 1443 based on the selection criteria 1407. The network node 1401 may also transmit or receive on that radio resource 1445 in accordance with the selected configuration. In addition, the network node 1401 assigns, to another wireless device 1413

(e.g., UE), that radio resource 1447 for those configurations 1433, 1443 that are not selected for transmission or reception on that radio resource 1447. Additionally or alternatively, the network node 1401 assigns, to the wireless device 1411, one or more other radio resources that is/are capable of carrying data that is intended for transmission or reception on that same radio resource 1447 for each multiple configuration 1433, 1443. The network node 1401 may include a radio resource assignment circuit 1409 to assign radio resources for the wireless device 1411 or the other wireless device 1413.

Additionally or alternatively, the network node 1401 may be configured to support a wireless communication system (e.g., NR, LTE, LTE-NR, 5G, UMTS, GSM, or the like). Further, the network node 1401 may be a base station (e.g., eNB), an access point, a wireless router, or the like. The network node 1401 may serve wireless devices such as wireless device 1411. The wireless device 1411 may be configured to support a wireless communication system (e.g., NR, LTE, LTE-NR, 5G, UMTS, GSM, or the like). The wireless device 1411 may be a UE, an MS, a terminal, a cellular phone, a cellular handset, a PDA, a smartphone, a wireless phone, an organizer, a handheld computer, a desktop computer, a laptop computer, a tablet computer, a set-top box, a television, an appliance, a game device, a medical device, a display device, a metering device, or the like.

Figure 15:
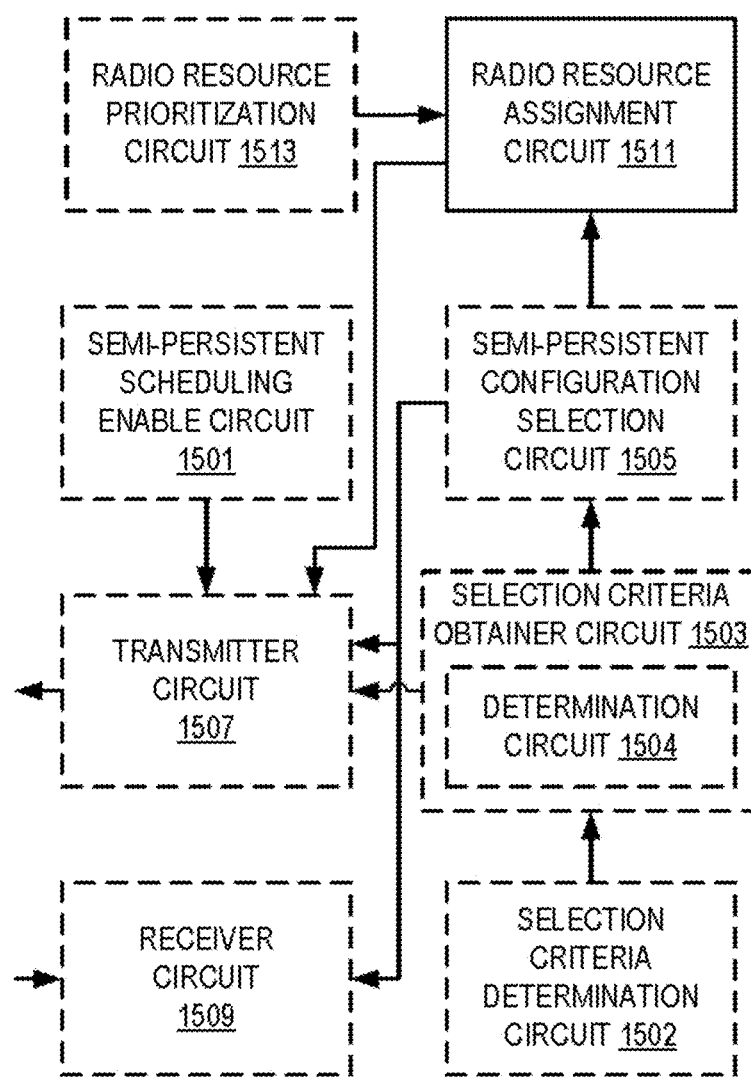
FIG. 15 illustrates one embodiment of a network node in accordance with various aspects as described herein.

FIG. 15 illustrates one embodiment of a network node 1500 in accordance with various aspects as described herein. In FIG. 15, the network node 1500 may include a semi-persistent scheduling enable circuit 1501, a selection criteria determination circuit 1502, a selection criteria obtainer circuit 1503, a semi-persistent configuration selection circuit 1505, a transmitter circuit 1507, a receiver circuit 1509, a radio resource assignment circuit 1511, a radio resource prioritization circuit 1513, the like, or any combination thereof. The semi-persistent scheduling enable circuit 1501 may be configured to enable semi-persistent scheduling of radio resources for wireless communications between the network node 1500 and a wireless device responsive to determining to enable the semi-persistent scheduling. The transmitter circuit 1507 may be configured to transmit, to the wireless device, an indication to enable semi-persistent scheduling of radio resources. The selection criteria determination circuit 1502 may be configured to determine selection criteria by which both the network node 1500 and the wireless device selects one of multiple activated semi-persistent configurations assigned to the wireless device responsive to determining that the multiple configurations have granted a same radio resource. The same radio resource may be a radio resource in the same TTI or in the same subframe. Further, the transmitter circuit 1507 may be configured to transmit, to the wireless device, the selection criteria.

Furthermore, the selection criteria obtainer circuit 1503 may include a determination circuit 1504 may be configured to determine that multiple activated semi-persistent configurations assigned to the wireless device have granted the same radio resource. The selection criteria obtainer circuit 1503 may be configured to obtain the selection criteria responsive to determining that the multiple configurations have granted the same radio resource. Also, the semi-persistent configuration selection circuit 1505 may be configured to select one of the multiple configurations based on the selection criteria. The transmitter circuit 1507 or the receiver circuit 1509 may be configured to transmit or receive on that radio resource in accordance with the selected configuration. The radio resource assignment circuit 1511 may be configured to assign, to one or more other wireless devices, that radio resource for those configurations that are not selected for transmission or reception on that radio resource responsive to determining that multiple activated semi-persistent configurations assigned to the wireless device have granted the same radio resource. Additionally or alternatively, the radio resource assignment circuit 1511 may be configured to assign, to the wireless device, one or more other radio resources that is capable of carrying data that is intended for transmission or reception on that same radio resource for each multiple configuration responsive to determining that multiple activated semi-persistent configurations assigned to the wireless device have granted the same radio resource. Further, the radio resource prioritization circuit 1513 may be configured to prioritize the one or more other radio resources as having a higher priority than the radio resource.

FIGS. 16A-B illustrate other embodiments of a network node 1600a,b in accordance with various aspects as described herein. In FIG. 16A, the network node 1600a (e.g., base station) may include processing circuit(s) 1601a, radio frequency (RF) communications circuit(s) 1605a, antenna(s) 1607a, the like, or any combination thereof. The communication circuit(s) 1605a may be configured to transmit or receive information to or from one or more network nodes or one or more wireless devices via any communication technology. This communication may occur using the one or more antennas 1607a that are either internal or external to the network node 1600a. The processing circuit(s) 1601a may be configured to perform processing as described herein (e.g., the methods of FIGS. 13, 17-19) such as by executing program instructions stored in memory 1603a. The processing circuit(s) 1601a in this regard may implement certain functional means, units, or modules.

In FIG. 16B, the network node 1600b may implement various functional means, units, or modules (e.g., via the processing circuit(s) 1601a in FIG. 16A or via software code). These functional means, units, or modules (e.g., for implementing the method of FIGS. 13, 17-19) may include an enabling module or unit 1611b for enabling semi-persistent scheduling of radio resources for wireless communications between the network node 1600b and a wireless device responsive to determining to enable the semi-persistent scheduling. Further, these functional means, units, or modules may include a transmitting module or unit 1617b for transmitting, to the wireless device, an indication to enable semi-persistent scheduling of radio resources. Also, these functional means, units, or modules may include a selection criteria determining module or unit 1612b for determining selection criteria by which both the network node 1600b and the wireless device selects one of multiple activated semi-persistent configurations assigned to the wireless device responsive to determining that the multiple configurations have granted a same radio resource. Further, the same radio resource may be a radio resource in the same TTI or in the same subframe. The transmitting module or unit 1617b may include transmitting, to the wireless device, the selection criteria.

Furthermore, these functional means, units, or modules may include a determining module or unit 1614b for determining that multiple activated semi-persistent configurations assigned to the wireless device have granted the same radio resource. These functional means, units, or modules may include an obtaining module or unit 1613b for obtaining the selection criteria responsive to determining that the multiple configurations have granted the same radio resource. Also, these functional means, units, or modules may include a selecting module or unit 1615*b* for selecting one of the multiple configurations based on the selection criteria. These functional means, units, or modules may include a receiving module or unit 1619*b* for receiving on that radio resource in accordance with the selected configuration. Additionally or alternatively, the transmitting module or unit 1617*b* may include transmitting on that radio resource in accordance with the selected configuration.

Moreover, these functional means, units, or modules may include an assigning module or unit 1621*b* for assigning, to one or more other wireless devices, that radio resource for those configurations that are not selected for transmission or reception on that radio resource responsive to determining that multiple activated semi-persistent configurations assigned to the wireless device have granted the same radio resource. Additionally or alternatively, the assigning module or unit 1621*b* may include assigning, to the wireless device, one or more other radio resources that is capable of carrying data that is intended for transmission or reception on that same radio resource for each multiple configuration responsive to determining that multiple activated semi-persistent configurations assigned to the wireless device have granted the same radio resource. Finally, these functional means, units, or modules may include a prioritizing module or unit 1623*b* for prioritizing the one or more other radio resources as having a higher priority than the radio resource.

Figure 17:
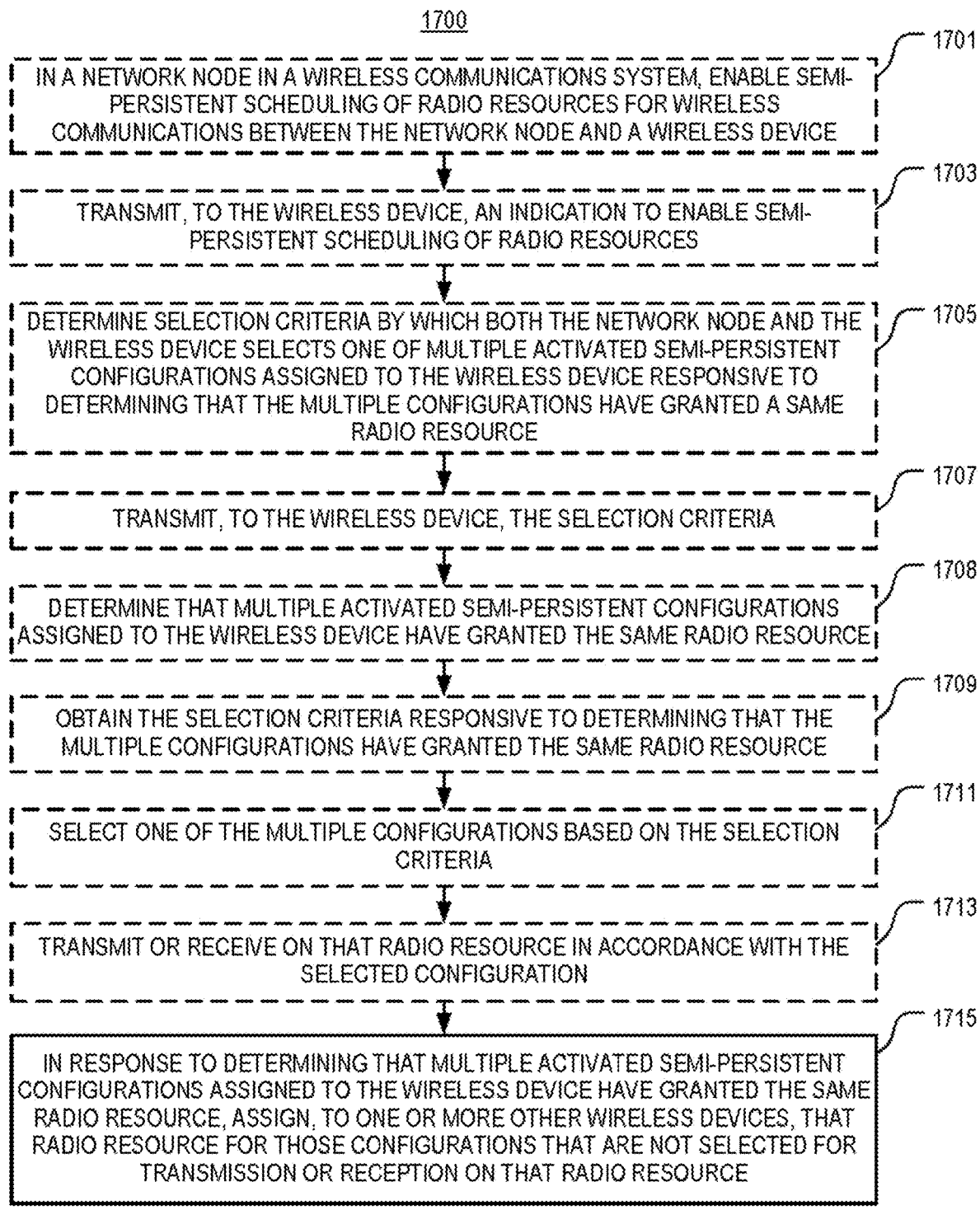
FIG. 17 illustrates another embodiment of a method performed by a network node for handling collisions between multiple semi-persistent grants in a wireless communication system in accordance with various aspects as described herein.

FIG. 17 illustrates another embodiment of a method 1700 performed by a network node for handling collisions between multiple semi-persistent grants in a wireless communication system in accordance with various aspects as described herein. The network node performing this method 1700 may correspond to any of the network nodes 201, 301, 1100, 1200*a-b*, 1401, 1500, 1600*a-b*, 2100 described herein. In FIG. 17, the method 1700 may start, for instance, at block 1701 where it may include enabling semi-persistent scheduling of radio resources for wireless communications between the network node and the wireless device responsive to determining to enable the semi-persistent scheduling. At block 1703, the method 1700 may include transmitting, to the wireless device, an indication to enable semi-persistent scheduling of radio resources. The method 1700 may include determining selection criteria by which both the network node and the wireless device selects one of multiple activated semi-persistent configurations assigned to the wireless device responsive to determining that the multiple configurations have granted a same radio resource, as referenced at block 1705. Further, the same radio resource may be a radio resource in the same TTI or in the same subframe. At block 1707, the method 1700 may include transmitting, to the wireless device, the selection criteria.

In FIG. 17, the method 1700 may include determining that multiple activated semi-persistent configurations assigned to the wireless device have granted the same radio resource, as represented by block 1708. In response to determining that the multiple configurations have granted the same radio resource, the method 1700 may include obtaining the selection criteria, as referenced at block 1709. At block 1711, the method 1700 may include selecting one of the multiple configurations based on the selection criteria. At block 1713, the method 1700 may include transmitting or receiving on that radio resource in accordance with the selected configuration. In response to determining that multiple activated semi-persistent configurations assigned to the wireless device have granted the same radio resource, the method 1700 includes assigning, to one or more other wireless devices, that radio resource for those configurations that are not selected for transmission or reception on that radio resource, as referenced at block 1715.

Figure 18:
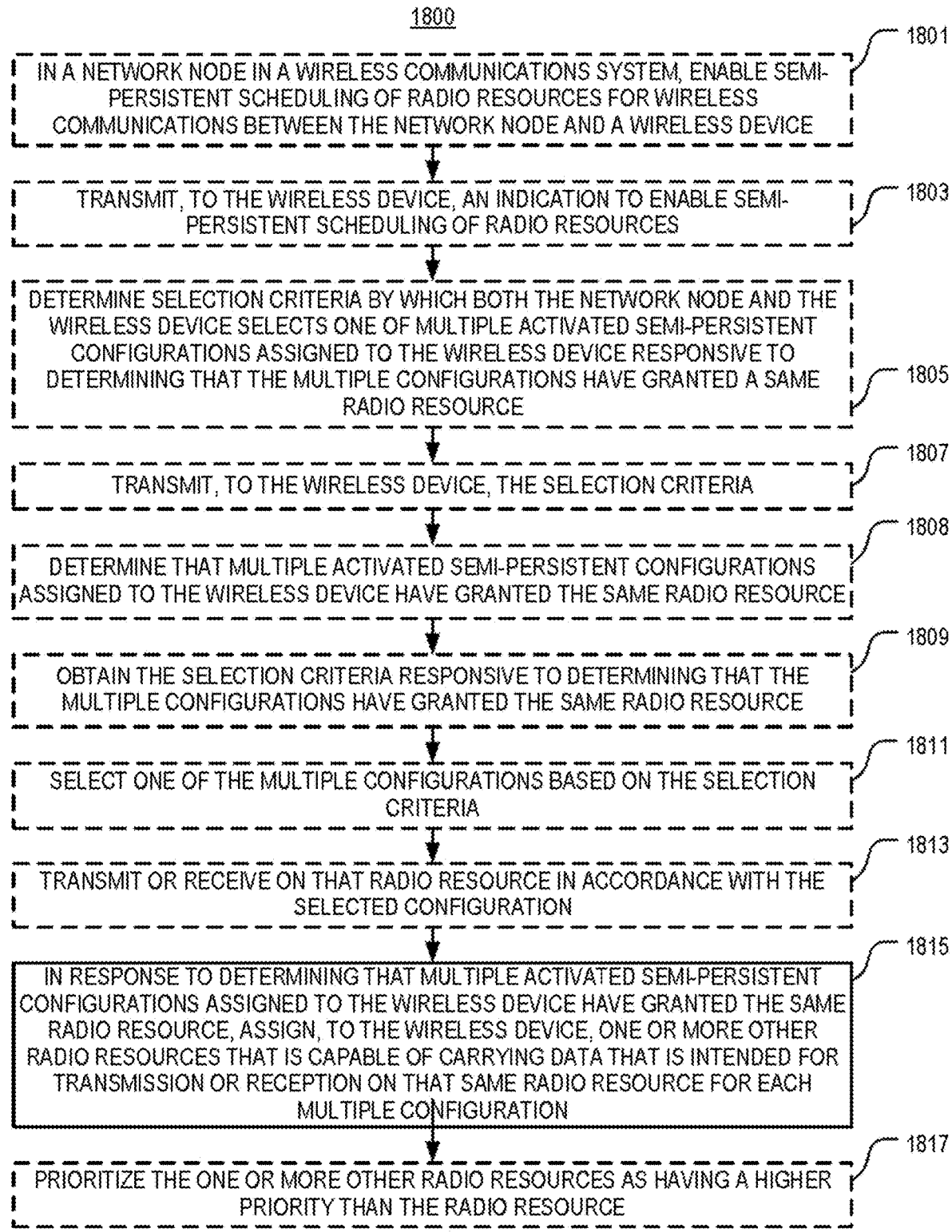
FIG. 18 illustrates another embodiment of a method performed by a network node for handling collisions between multiple semi-persistent grants in a wireless communication system in accordance with various aspects as described herein.

FIG. 18 illustrates another embodiment of a method 1800 performed by a network node for handling collisions between multiple semi-persistent grants in a wireless communication system in accordance with various aspects as described herein. The network node performing this method 1800 may correspond to any of the network nodes 201, 301, 1100, 1200*a-b*, 1401, 1500, 1600*a-b*, 2100 described herein. In FIG. 18, the method 1800 may start, for instance, at block 1801 where it may include enabling semi-persistent scheduling of radio resources for wireless communications between the network node and the wireless device responsive to determining to enable the semi-persistent scheduling. At block 1803, the method 1800 may include transmitting, to the wireless device, an indication to enable semi-persistent scheduling of radio resources. The method 1800 may include determining selection criteria by which both the network node and the wireless device selects one of multiple activated semi-persistent configurations assigned to the wireless device responsive to determining that the multiple configurations have granted a same radio resource, as referenced at block 1805. Further, the same radio resource may be a radio resource in the same TTI or in the same subframe. At block 1807, the method 1800 may include transmitting, to the wireless device, the selection criteria.

In FIG. 18, the method 1800 may include determining that multiple activated semi-persistent configurations assigned to the wireless device have granted the same radio resource, as referenced at block 1808. In response to determining that the multiple configurations have granted the same radio resource, the method 1800 may include obtaining the selection criteria, as referenced at block 1809. At block 1811, the method 1800 may include selecting one of the multiple configurations based on the selection criteria. At block 1813, the method 1800 may include transmitting or receiving on that radio resource in accordance with the selected configuration. In response to determining that multiple activated semi-persistent configurations assigned to the wireless device have granted the same radio resource, the method 1800 includes assigning, to the wireless device, one or more other radio resources that is capable of carrying data that is intended for transmission or reception on that same radio resource for each multiple configuration, as referenced at block 1815. At block 1817, the method 1800 may include prioritizing the one or more other radio resources as having a higher priority than the radio resource.

Figure 19:
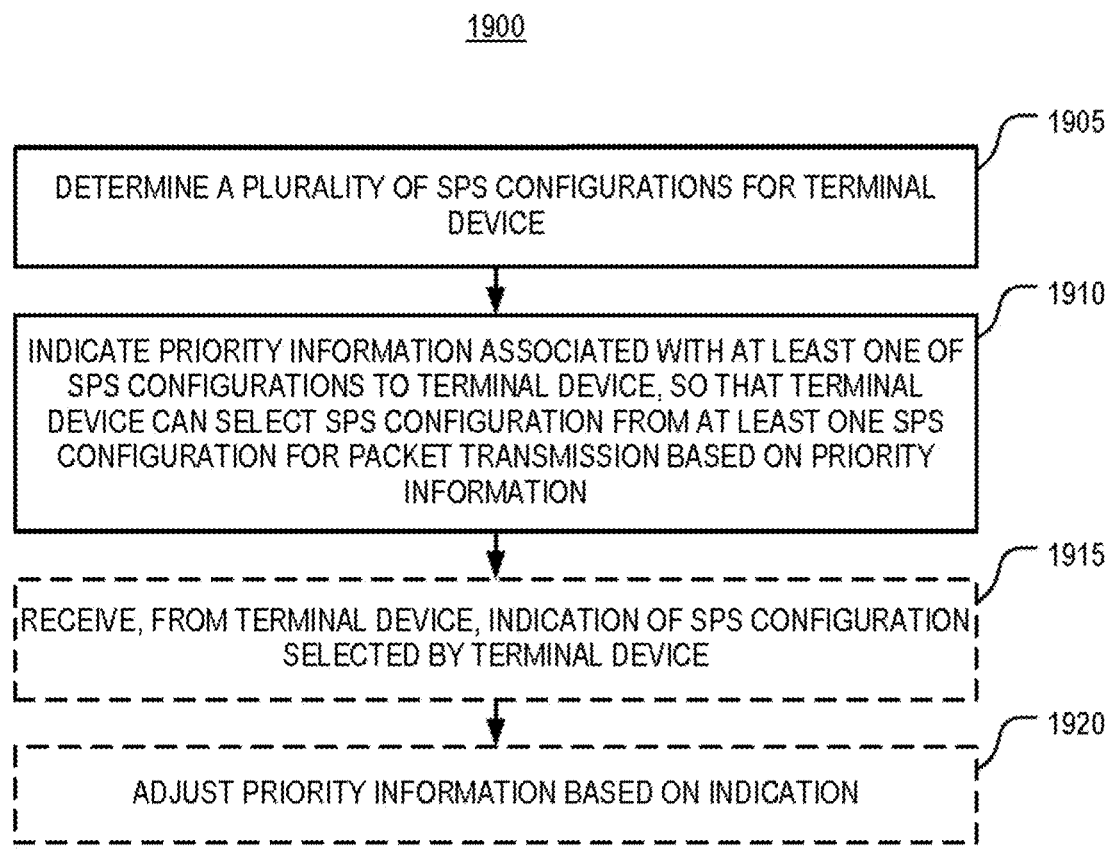
FIG. 19 is a flowchart of a method in accordance with some embodiments of the present disclosure.
Figure 20:
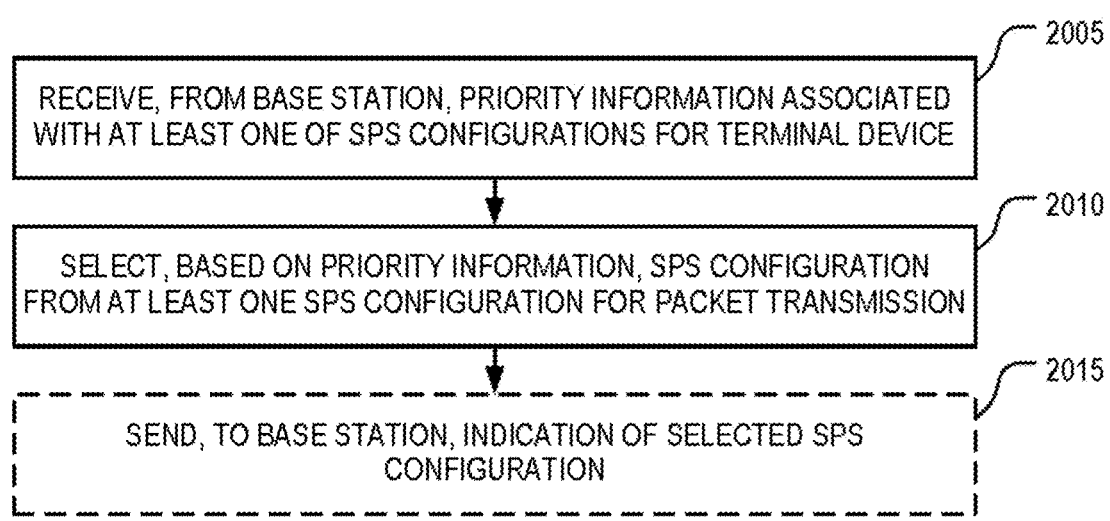
FIG. 20 is a flowchart of a method in accordance with some other embodiments of the present disclosure.

With reference to FIGS. 19-20, principles and implementations of the present disclosure will be described in detail below from the perspective of a base station and a terminal device, respectively. The base station performing the method 1900 may correspond to any of the network nodes 201, 301, 1100, 1200*a-b*, 1401, 1500, 1600*a-b*, 2100 described herein. The terminal device performing the method 2000 may correspond to any of the wireless devices 211, 311, 400, 500*a-b*, 700, 800*a-b*, 1000, 1411, 2200 described herein. At block 1905, the base station determines a plurality of SPS configurations for the terminal device. These SPS configurations may be applied for both the cellular and D2D communications. According to embodiments of the present disclosure, the SPS configurations may be determined for the terminal device by using any suitable technology either already known or to be developed in the further. The scope of the present disclosure is not limited in this regard. At block 1910, the base station indicates to the terminal device priority information associated with at least one of the determined SPS configurations. Accordingly, based on the indicated priority information, the terminal device can select one of the SPS configurations for use in packet transmission. In this way, with the priority information, multiple terminal devices may be scheduled to transmit packets in a way that enables significantly reduced collisions of packet transmission at the terminal device.

The priority information may be any suitable information that is associated with a priority level of a SPS configuration. In some embodiments, the priority information may be the priority level itself. For example, the base station may determine priority levels of the SPS configurations which are determined at block 1905. Then, the base station may indicate the priority levels to the terminal device.

Further, the terminal device may select an SPS configuration from the SPS configurations based on the priority levels. For example, in some situations, the terminal device may select the SPS configuration with the highest priority level. The operations at the terminal device will be detailed in the following paragraphs with reference to FIG. 20.

It is to be understood that the determination and indication of all of the priority levels of the SPS configurations are optional but not necessary. In some embodiments, the base station may determine and indicate some of the SPS configurations with the higher priority levels, or even only the SPS configuration with the highest priority level.

According to embodiments of the present disclosure, the priority levels of the SPS configurations may be determined by the base station by taking any suitable factor into account. For example, in some embodiments, a priority level of a SPS configuration may be associated with a packet type for the terminal device. In such embodiments, the priority level of the SPS configuration may be determined in association with the packet type for the terminal device.

In some embodiments of the present disclosure, each SPS configuration is associated with a grant for uplink scheduling, i.e., an uplink grant. The priority information may be determined from the uplink grant issued by the base station. The uplink grant includes information indicating an amount of resources to be allocated for uplink transmission of the terminal device. Particularly, the amount of the resources to be allocated may refer to either a number of physical resource blocks or a size of a transport block, i.e. the number of bits to be carried on the resources allocated by the grant, which may be referred to as Transport Block Size, TBS. Considering that an uplink grant indicating a bigger amount of resources can provide more space for a terminal device to carry its traffic, it will be more helpful for the terminal device to deliver the traffic. Thus, the SPS configuration associated with an uplink grant indicating the bigger amount of resources will have a higher priority level.

It shall be understood by those skilled in the art that in this embodiment, the base station may not necessarily explicitly determine and indicate the priority information/level to the terminal device. The terminal device can obtain the priority information/level implicitly from the uplink grant. For example, the amount of resources to be allocated by a grant can be indicated in downlink control information (DCI) when initiating a SPS configuration, so it can be known by the terminal device in advance. The terminal device can obtain the priority information/level of the SPS configuration from the grant associated with that SPS configuration. In other words, the base station implicitly indicates the priority information of the SPS configuration to the terminal device via the uplink grant.

It shall be appreciated that the uplink grant is sent from the base station to the terminal device, accordingly both the base station and the terminal device have knowledge of the grant and thus of the amount of resources to be allocated. In an embodiment, the SPS configuration can be selected directly based on the knowledge of the grant, particularly on the amount of resources to be allocated. In this embodiment, the determination and indication of priority information can be regarded as being implicitly performed.

In some other embodiments, a priority level of a SPS configuration may be associated with a packet type for the terminal device. In such embodiments, the priority level of the SPS configuration may be determined in association with the packet type for the terminal device.

As described above, in the V2x communications, the terminal devices may communicate, for example, in two packet types which include a smaller packet having a shorter period of one hundred milliseconds (100 ms.) and a smaller size of one hundred and ninety (190) bytes and a larger packet having a longer period of five hundred milliseconds (500 ms.) and a larger size of three hundred (300) bytes. Furthermore, these two packet types are assigned with two SPS configurations having different numbers of PRBs and MCSs. In this case, if the terminal device is to transmit the smaller packet, the SPS configuration assigned to the shorter packet is prioritized. If the terminal device is to transmit the larger packet, the SPS configuration assigned to the larger packet is prioritized.

Alternatively, or in addition, in other embodiments, a priority level of a SPS configuration may be associated with a traffic type for the terminal device. In such embodiments, the priority level of the SPS configuration may be determined in association with the traffic type for the terminal device. For example, different SPS configurations assigned to different traffic types may have different priority levels. If the terminal device is to use a specific traffic type, the SPS configuration assigned to the traffic type may have a higher priority level.

As described above, in the V2x communications, the larger packet generally includes a security certificate which may be used for the reception of the smaller packet. In this case, as an example, if the terminal device is to transmit the security certificate, the SPS configuration for the transmission of the security certificate may have a higher priority level.

In addition to or instead of the above examples, other traffic properties may be taken into account in determining a priority level of a SPS configuration. Examples of such properties may include, but not limited to, requirements of latency, quality of service (QoS), reliability, and the like. For example, if the terminal device is to initiate the traffic requiring a lower latency, the SPS configuration having a shorter message generation period may have a higher priority.

It is to be understood that the determination of the priority levels of the SPS configurations may not necessarily be implemented by the base station. In some embodiments, the priority levels may be determined by other network devices, such as a radio network controller, or even a core network device. Accordingly, the base station may obtain the priority information from these network devices and further indicate it to the terminal device.

According to embodiments of the present disclosure, the priority information may be indicated by the base station to the terminal device in any suitable information. In some embodiments, the base station may use an information element (IE) to indicate which SPS configuration has a higher level. For example, different values of the IE may indicate different priority levels. The IE may be implemented as a new IE which is designed dedicatedly for indicating the priority level of the SPS configuration. Alternatively, an existing IE may be reused to implement the indications.

In some embodiments, a priority level of a SPS configuration corresponds to a priority level of a packet type. In conventional V2x communications, depending on the requirements of QoS, for example, a packet type may correspond to a specific priority level which is indicated using a priority value, such as a ProSe Per-Packet Priority (PPPP) value. For example, the 300-byte packet is associated with a packet priority I, while the 190-byte packet is associated with a packet priority II. In this case, according to embodiments of the present disclosure, the priority level of the packet type can be reused to indicate the priority level of the corresponding SPS configuration. Specifically, the priority level of the SPS configuration for the corresponding packet type may be indicated by the priority level of the packet type.

The indication of the priority level of the SPS configuration by the priority level of the corresponding packet type may be combined with the determination of the priority level of the SPS configurations based on the packet type as described above. For example, if a priority level of a SPS configuration is determined based on the corresponding packet type, the priority level of the SPS configuration may be indicated by the priority level of the packet type.

It is also possible that the indication and the determination may be separated from each other. For example, the association between a priority level of a packet type and a priority level of a SPS configuration may be built in advance, for example, between the base station and the terminal device. Then, the base station may use the priority level of the packet type to indicate the corresponding priority level of the SPS configuration to the terminal device.

In other embodiments, the priority level of the SPS configuration may be indicated by a logic channel identification (ID) corresponding to a traffic type for the terminal device. In the V2x communications, a traffic type may be conventionally assigned to a logical channel ID. According to embodiments of the present disclosure, the logical channel ID may be reused to indicate the priority of the SPS configuration. For example, one logical channel ID may be associated with a priority of a SPS configuration in advance, and a higher ID value indicates a higher priority level of the SPS configuration, and vice versa, for example.

Specifically, as described above, the priority level of the SPS configuration may be determined based on the traffic type, and the traffic type has an associated logical channel ID. Therefore, in those embodiments where a traffic type is used to determine the priority level, the priority level can be indicated by the logical channel associated with that traffic type.

In addition to or instead of the IE, the priority level of the packet type, and the logical channel ID as discussed above, in some embodiments, the priority level of the SPS configuration may be indicated by an index of the SPS configuration. For example, in some embodiments, each SPS configuration is assigned with an index which is associated with its priority level. In such embodiments, the base station may indicate the priority of the SPS configuration using the associated index.

Alternatively, or in addition, the base station may send signaling to the terminal device to explicitly indicate a priority level of a SPS configuration or the SPS configuration to be used by the terminal device. Examples of the signaling may include, but not limited to, signaling in a physical control channel, such as physical downlink control channel (PDCCH), a media access control (MAC) control element (CE), or radio resource control (RRC) signaling.

Still in reference to FIG. 19, in some embodiments, at block 1915, the base station may receive an indication of the SPS configuration that is selected by the terminal device. The indication of the selected SPS configuration may be implemented in signaling sent by the terminal device to the base station. Examples of the signaling may include, but not limited to, signaling in a physical control channel, such as physical uplink control channel (PUCCH), a MAC CE, or RRC signaling. In response, at block 1920, the base station may adjust the priority information based on the received indication. In this way, the priority levels of the SPS configurations may be updated in real time based on the use of the SPS configurations. Further, unused SPS configurations may be prioritized, and therefore resource utilization may be further enhanced.

FIG. 20 shows a flowchart of an example method 2000 in accordance with some other embodiments of the present disclosure. The method 2000 can be implemented at the terminal device. At block 2005, the terminal device receives from the base station priority information associated with at least one of a plurality of SPS configurations for the terminal device. As described above, these SPS configurations may be applied for both the cellular and D2D communications. At block 2010, based on the priority information, the terminal device selects an SPS configuration from the at least one SPS configuration for packet transmission. As described above, the priority information may be any suitable information that is associated with a priority level of a SPS configuration. In some embodiments, the priority information may be the priority level itself. Accordingly, the terminal device may select one of the SPS configurations with a higher priority level.

The priority level may be associated with any suitable factor. In some embodiments, the priority level may be associated with a packet type to be used by the terminal device. As described above, the SPS configurations for different packet types may be assigned to different priority levels. In response to a packet type to be used by the terminal device, the terminal device may select the SPS configuration having a higher priority level for the packet type.

In some embodiments, the priority level may be associated with an amount of resources to be allocated by an uplink grant. In an embodiment, the terminal device may receive an uplink grant from the base station which indicates an amount of resources to be allocated for uplink transmission associated with an SPS configuration. Particularly, the amount of the resources to be allocated may refer to either a number of physical resource blocks or a size of a transport block, i.e. the number of bits to be carried on the resources allocated by the grant, which may be referred to as Transport Block Size, TBS. Then, the terminal device can obtain the priority information/level of the SPS configuration from the uplink grant, particularly based on the resource amount as discussed above. In such case with the priority information/level is explicitly obtained, the terminal device can select an SPS configuration based on the priority information/level.

In another embodiment, the terminal device may select the SPS configuration directly based on the amount of resources as indicated by the uplink grant without explicitly obtaining the priority information/levels of the SPS configurations. For example, the terminal device may select an SPS configuration associated with an uplink grant indicating a larger amount of resources over another SPS configuration associated with an uplink grant indicating a smaller amount of resources.

In some embodiments, the priority level may be associated with a packet type to be used by the terminal device. As described above, the SPS configurations for different packet types may be assigned to different priority levels. In response to a packet type to be used by the terminal device, the terminal device may select the SPS configuration having a higher priority level for the packet type.

The priority level may be also associated with a traffic type to be used by the terminal device. Likewise, the SPS configurations for different traffic types may correspond to different priority levels, as described above. Accordingly, the terminal device may select one of the SPS configurations having a higher priority level for the traffic type to be used.

The priority level of the SPS configuration may be indicated in any suitable information, as described above. For example, an existing or new IE may be used for the indication. As another example, a priority level of a packet type and/or a logical channel ID corresponding to a traffic type may be reused to indicate a priority level of a SPS configuration.

Alternatively, or in addition, an index of a SPS configuration may be used for indicating the priority level of the SPS configuration. In this case, after receiving an indication of the indices of the SPS configurations from the base station, the terminal device may determine priority levels of the SPS configurations based on the indices. The signaling sent from the base station may also be used to indicate the priority level of the SPS configuration, as described above.

In some embodiments, at block 2015, the terminal device may send an indication of the selected SPS configuration to the base station. Based on the received indication, the base station may update the priority levels of the SPS configurations, such that unused SPS configurations may be prioritized. As a result, the resource utilization may be further improved.

It is to be understood that all operations and features related to the base station described above with reference to FIG. 19 are likewise applicable to the method 2000 and have similar effects. For the purpose of simplification, the details will be omitted.

Figure 21:
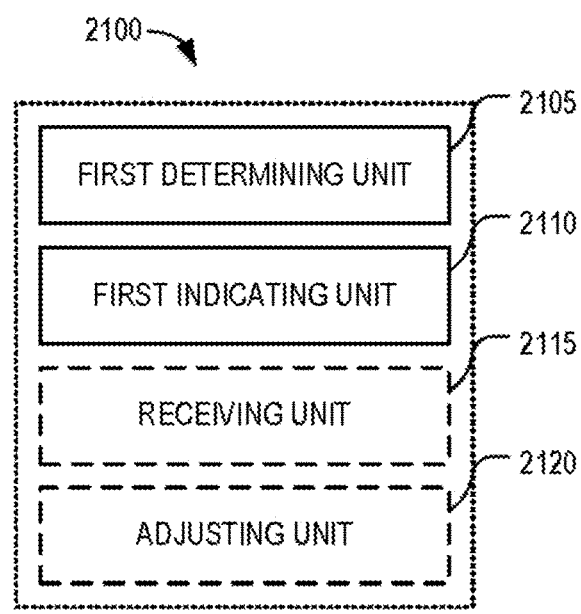
FIG. 21 is a block diagram of a base station in accordance with some embodiments of the present disclosure.

FIG. 21 shows a block diagram of a base station 2100 in accordance with some embodiments of the present disclosure. As shown, the base station 2100 comprises: a first determining unit 2105 configured to determine a plurality of SPS configurations for a terminal device; and a first indicating unit 2110 configured to indicate priority information associated with at least one of the plurality of SPS configurations to the terminal device, so that the terminal device can select a SPS configuration from the at least one SPS configuration for packet transmission based on the priority information. In some embodiments, the plurality of SPS configurations may be applied for both cellular and D2D communications.

In some embodiments, the first indicating unit 2110 may comprise: a second determining unit (not shown) configured to determine a priority level of the at least one SPS configurations; and a second indicating unit (not shown) configured to indicate the priority level to the terminal device. In some embodiments, the second determining unit may comprise: a third determining unit configured to determine the priority level associated with a packet type for the terminal device. In some other embodiments, the second determining unit may comprise: a fourth determining unit configured to determine the priority level associated with a traffic type for the terminal device.

In some embodiments, the first indicating unit 2110 may comprise: a third indicating unit configured to indicate a priority level of the at least one SPS configuration in an IE to the terminal device. In some embodiments, the first indicating unit 2110 may comprise: a fourth indicating unit configured to indicate, to the terminal device, a priority level of a packet type for the terminal device, wherein the priority level of the packet type is associated with a priority level of the at least one SPS configuration.

In some embodiments, the first indicating unit 2110 may comprise: a fifth indicating unit configured to indicate, to the terminal device, a logic channel identification corresponding to a traffic type for the terminal device, wherein the logic channel identification is associated with a priority level of the at least one SPS configuration. In some other embodiments, the first indicating unit 2110 may comprise: an assigning unit configured to assign an index to the at least one SPS configuration, where the index is associated with a priority level of the at least one SPS configuration; and a sixth indicating unit configured to indicate the index to the terminal device.

In some embodiments, the base station 2100 may further comprise: a receiving unit 2115 configured to receive, from the terminal device, an indication of the SPS configuration selected by the terminal device; and an adjusting unit 2120 configured to adjust the priority information based on the indication.

Figure 22:
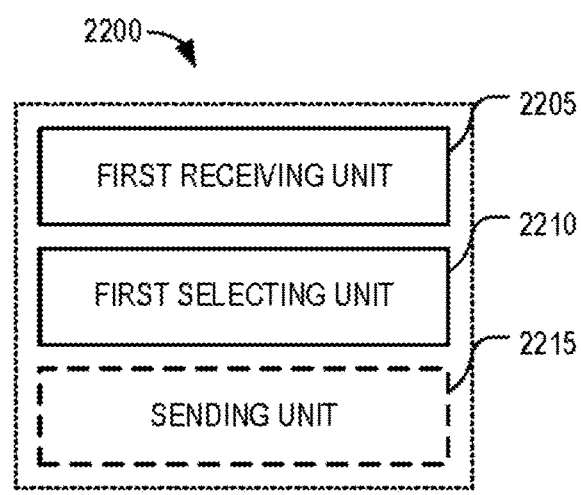
FIG. 22 is a block diagram of a terminal device in accordance with some embodiments of the present disclosure.

FIG. 22 shows a block diagram of a terminal device 2200 in accordance with some embodiments of the present disclosure. As shown, the terminal device 2200 comprises: a first receiving unit 2205 configured to receive, from a base station, priority information associated with at least one of a plurality of SPS configurations for the terminal device; and a first selecting unit 2210 configured to select, based on the priority information, an SPS configuration from the at least one SPS configuration for packet transmission. In some embodiments, the plurality of SPS configurations may be applied for both cellular and D2D communications.

In some embodiments, the first receiving unit 2205 may comprise: a second receiving unit configured to receive, from the base station, the priority information indicative of a priority level of the at least one SPS configuration.

In some embodiments, the priority level may be associated with a packet type to be used by the terminal device. In these embodiments, the first selecting unit 2210 may comprise: a first determining unit configured to determine the packet type to be used by the terminal device; and a second selecting unit configured to select the SPS configuration from the at least one SPS configuration based on the packet type.

In some embodiments, the priority level may be associated with a traffic type to be used by the terminal device. In these embodiments, the first selecting unit 2210 may comprise: a second determining unit configured to determine the traffic type to be used by the terminal device; and a third selecting unit configured to select the SPS configuration from the SPS configurations based on the traffic type.

In some embodiments, the first receiving unit 2205 may comprise: a third receiving unit configured to receive, from the base station, an indication of a priority level of the at least one SPS configuration in an IE. In some embodiments, the first receiving unit 2205 may comprise: a fourth receiving unit configured to receive, from the base station, an indication of a priority level of a packet type for the terminal device, wherein the priority level of the packet type is associated with a priority level of the at least one SPS configuration.

In some embodiments, the first receiving unit 2205 may comprise: a fifth receiving unit configured to receive, from the base station, an indication of a logic channel identification corresponding to a traffic type for the terminal device, wherein the logic channel identification is associated with a priority level of the at least one SPS configuration. In some other embodiments, the first receiving unit 2205 may comprise: a sixth receiving unit configured to receive, from the base station, an indication of an index of the at least one SPS configuration; and a third determining unit configured to determine a priority level of the at least one SPS configuration based on the index.

In some embodiments, the terminal device 2200 may further comprise: a sending unit 2215 configured to send, to the base station, an indication of the selected SPS configuration.

It should be appreciated that units included in the apparatuses 2100 and 2200 correspond to the blocks of the methods 1900 and 2000. Therefore, all operations and features described above with reference to FIGS. 19-20 are likewise applicable to the units included in the apparatuses 2100 and 2200 and have similar effects. For the purpose of simplification, the details will be omitted.

The devices described herein including the units of the apparatuses 2100 and 2200 may be implemented in various manners, including software, hardware, firmware, or any combination thereof. In one embodiment, one or more devices or units thereof may be implemented using software and/or firmware, for example, machine-executable instructions stored on the storage medium. In addition to or instead of machine-executable instructions, parts or all of the devices or units thereof may be implemented, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

Additional Detailed Description

An enhanced or new SPS protocol is needed to deal with any combination of new periodic traffic types such as V2X, and classical periodic traffic types such as VoIP. This new SPS protocol should also consider a mixture of traffic that is transmitted by the UE in different interface, i.e. the PC5 (sidelink) and/or the Uu (uplink). Further, this new SPS protocol should provide the UE with multiple SPS configurations simultaneously. Depending on how the multiple SPS configurations are provided by the eNB, it may occasionally happen that more than one SPS grant is available in the same TTI.

This new protocol introduces the possibility to configure the UE with multiple SPS configurations (rather than just one as in current implementations such as in 3GPP) and introduces a new form of UE assistance report to the eNB. Such UE assistance information aids the network to better figure out the traffic patterns that the UE is generating, and include estimation of packet arrival time at the UE and the related traffic type periodicity.

Often, due to SC-FDM constraints, the UE may select only one of the available SPS grants to perform a transmission with. The UE selects this based on UE implementation. The eNB should then either detect and decode any of the resources for which the UE has grants for in order to receive the UEs transmission. Alternatively, the eNB may guess which grant the UE will use and decode the resources associated with that grant. In some scenarios the eNB may be limited in the number of decodings that the eNB may perform and in such scenarios the capacity of the eNB may become the bottle neck which limits system performance and resource utilization.

Another issue which arises due to that a UE (or in general a transmitter) may only be able to perform one transmission at a certain point in time, e.g. only transmit using one grant even when multiple grants has been assigned, is that the UE may not be able to transmit all data which is available for transmission.

Similar issues may apply to D2D communications such as sidelink communications. For a receiving UE, it may be computationally intensive and expensive to perform blind detection on all the possible SPS resources a transmitting UE may select in a given subframe.

The present disclosure describes, among other things, methods to determine which of the configured SPS grants the UE should select, in the event that multiple configured SPS grants are made available to the UE in the same subframe. The present disclosure applies to the uplink, downlink, or to the sidelink.

This disclosure describes deterministic methods for the UE to select one of the available configured SPS grants that collide in the same TTI, thereby simplifying the processing/decoding effort of the eNB that does need to perform blind detection of PUSCH for all the configured SPS grants that might occasionally occur in the same subframe.

For the sidelink, since the configured SPS configurations are announced in sidelink control signaling, the receiving UE would limit amounts of blind detections if it knows which of the available sidelink SPS grants the transmitting UE will select.

Additionally, by knowing which of the configured SPS grants the UE will select, the network may reallocate resources corresponding to SPS resources (either UL or SL resources) that the UE will not use and schedule other UEs (either in the UL or in the SL).

Also, this disclosure provides methods for the eNB to provide a backup grant which may be used in case there are collisions between other grants and this backup grant may be large enough to fit the traffic of the colliding grants.

It will herein be discussed "SPS grants" which is a feature defined for some 3GPP technologies. It should be appreciated thought that "SPS grant" it is only used as an example of a type of grant but the embodiments described herein may be applied to other types of grants. Similarly, in some cases LTE terminology will be used such as eNB and UE, but the techniques described herein may be applied to other technologies as well where the corresponding nodes may have other names.

Also, while it sometimes will be used as example that two grants are colliding, the embodiments herein are generic and may be applied to collisions between more than two grants.

Below provides a list of criteria which the UE may apply when selecting which grant to use in case there is a collision between multiple grants. The UE may apply one or more of these criteria at one time:

First, among the set of configured SPS grants available to the UE in the same subframe, the UE selects one configured SPS grant on the basis of the index of the SPS configuration. Since, each SPS configuration is addressed by an SPS configuration index, the UE selects the configured SPS grant which has the lowest (or highest) SPS configuration index. The eNB may then assign the lowest (or highest) SPS index to the grant which the eNB determines should have highest priority.

Second, among the set of configured SPS grants available to the UE in the same subframe, the UE selects the configured SPS grant depending on the size, e.g. the largest SPS grant. In case there is a first set of SPS grants that is of equal size and largest than a second set of SPS grants, the UE selects one SPS grant in the first set following the criteria on bullet 1, i.e. the one which has lowest (or highest) SPS index.

Third, among the set of available configured SPS grants available to the UE in the same subframe, the UE selects the configured SPS grant which has highest priority. The priority of each SPS configuration may be indicated by the eNB. This may be indicated as part of the configuration (e.g. the SPS configuration) which is configured using RRC signaling. Another way of providing the priority to the UE is to signal it in a physical-layer signal such as a DCI, e.g. the DCI which activates an SPS-configuration/grants. The priority may be configured using a value from e.g. 1-8 where a lower (or higher) value indicates a higher priority. For instance, to be able to configure a value 1 to 8 requires three bits.

Another way in which the priority is indicated is to indicate for an SPS-configuration whether this SPS-configuration should be prioritized over other SPS-configuration(s). This has the benefit that it only requires a one bit indication; if the indication is set to a first value it indicates that the grants associated with this configuration should be prioritized over grants associated with other configurations. It also allows the change of priority between two SPS-configurations without providing an update for both these configurations. Rather the eNB may only provide an update for one of the configurations (namely the configuration which from now on should be prioritized highest).

As described above, the UE may apply one or more of the above criteria. For example, the UE may apply the criterion consider the size of the grant first but if there are for example two grants which have the same size the UE may apply another criterion to select between these two grants.

The above criteria may also be used to prioritize uplink (UL) over sidelink (SL) and vice versa. For example, if a UE in a certain TTI is not capable, due to radio frequency capability limitation, to perform simultaneous transmission on UL and SL, and UL and SL SPS grants are available in the same subframe, the UE switches the radio frequency transmitting chain on the radio interface (either UL or SL) whose SPS grant is prioritized according to one of the above criteria.

In another embodiment, in case of collision among a set of configured SPS grants, the eNB reschedules resources that will not be selected by the UE according to the selection criteria rules described above. For example, if a UE is configured with grants G1 and G2 and the eNB knows (e.g., based on knowledge of which of the grants the UE will use as described above) the eNB may use the resources associated with the other grant for some other purpose such as allocating them for another UE.

In another embodiment, As described above, a UE may only be able to transmit using at most one grant at any point in time (it should be noted that this restriction may be applicable only within one carrier, within one transceiver, etc.). This may result in that the UE is only able to transmit all traffic which the UE has available for transmission. For example, the eNB may have provided one grant G1 with a 10 milliseconds periodicity which the UE may use to transmit a traffic T1, and one grant G2 for a 100 milliseconds periodicity which the UE may use to transmit a traffic T2.

It should be noted that while it above says that the UE uses a certain grant for a certain traffic it may not mean that the UE is only allowed to transmit that certain traffic using that grant, rather the above description is describing an example where the UE may have two types of traffic to transmit and the UE may have acquired from the eNB grants which to some degree matches those types of traffic.

In the above example the UE has two SPS grants (G1 and G2) where the UE in general transmits traffic T1 and T2 respectively. In this case the two SPS grants may collide with a certain periodicity. When such collisions happen, the UE will only be able to select and use one of the two grants. If the size of the two grants are sized to suit the associated traffic, then the UE may not be able to transmit both traffic T1 and T2 using one of these two grants (either G1 or G2).

In one embodiment, the eNB will provide a grant which is valid at least at (or close in time to) the time when the collision between multiple grants happens. For brevity, these types of grants will herein be referred to as backup grants. The size of the backup grants may be (close to) the sum of the sizes of the grants which will collide. It should be noted that the grant size has a certain granularity and hence it may not be possible to provide a grant which is exactly the size of two (or more) other grants. The eNB may therefore select the size of the backup grant to be somewhat larger or smaller than the sum of the colliding grants.

And in case this embodiment is used in the example scenario above; the eNB may configure a third grant G3 which is valid when G1 and G2 collides. And the size of G3 may be the size of G1+size of G2.

This then allows the UE to transmit the data which it usually transmits using G1 as well as the data which it usually transmits using G2, even when there is a collision.

This embodiment with the backup grants may create yet another collision, e.g. collision between G1, G2 and the backup grants G3. However, by applying the embodiments described above, the eNB may be able to control/configure which of the grants the UE applies in case of a collision and the eNB may then control the UE such that the UE will prioritize the backup grants. For instance, the eNB ensures (e.g., by configuration or knowledge about how the UE prioritizes) that the UE prioritizes G3 when it collides with G1 and G2.

In another embodiment, the eNB provides a dynamic grant (e.g., not a configured grant but rather a grant which the eNB schedules shortly in time before the associated transmission should take place) to the UE proximate those times when the collisions between SPS-grants collide. The UE prioritizes dynamic grants and hence, with this approach, the eNB gives a grant to the UE when SPS-grants will collide and the UE then transmits using the dynamic grant. The eNB may select the size of the dynamic grant such that it can fit the data the UE usually transmits in all of the colliding grants.

In another embodiment, due to different periodicities of SPS configurations, two or more SPS occasions may collide in the same subframe. The behavior of the wireless device (e.g., UE) for this type of collision is currently undefined. For this type of collision, the network node (e.g., eNB) may be unable to predict the behavior of the wireless device, including the network node being unaware of the used and unused colliding SPS grants. For this type of collision, the network node may need to perform blind detection on the colliding SPS resources to verify whether any uplink transmission has been performed in the colliding SPS occasions. However, by doing so, the network node would lose network capacity, processing, and resources. Since the network node is not aware of which colliding SPS resources the wireless device will use, the network node may be unable to reallocate the unused colliding SPS resources. In short, an SPS grant collision in a subframe would result in poor spectral efficiency and wasted network node processing and resources. To avoid these drawbacks, a wireless device may select an uplink SPS grant corresponding to an SPS configuration having the lowest or highest SPS index (e.g., sps-ConfigIndex) when there is a resource conflict between multiple uplink SPS grants in the same subframe. In one example, a wireless device selects an uplink SPS grant corresponding to an SPS configuration having the lowest SPS index when there is such resource conflict. In another example, a wireless device selects an uplink SPS grant corresponding to an SPS configuration having the lowest value of an sps-ConfigIndex parameter that is used to identify the SPS configuration.

In another embodiment, in situation where multiple SPS uplink grants occur in the same subframe, the UE behavior is left undefined. It is important for the eNB implementation to be aware of which grant the UE is going to use, to limit resource wastage and blind detection. The eNB should be aware of which UL SPS grant the UE is going to use in case of conflicts between multiple SPS configurations. Accordingly, the UE selects the SPS grant which corresponds to the lowest SPS configuration index. If this were not performed, then the eNB would not be aware of which UL SPS grant (if any) the UE is going to select, resulting in increased processing/decoding effort at eNB side and resource inefficiency.

In another embodiment, after an SPS uplink grant is configured, the MAC entity shall:
  if twoIntervalsConfig is enabled by upper layer:
    set the Subframe_Offset according to Table 7.4-1 of LTE; Evolved Universal Terrestrial Radio Access (E-UTRA); Medium Access Control (MAC) protocol specification, 3GPP TS 36.321 version 11.1.0 Release 11 (2013-02).
  else:
    set Subframe_Offset to 0.
  consider sequentially that the $N^{th}$ grant occurs in the subframe for which:

$(10*SFN+\text{subframe})=[(10*SFN_{start\ time}+$
    $\text{subframe}_{start\ time})+$
    $N*\text{semiPersistSchedIntervalUL}+\text{Subframe\_Offset}*(N\bmod 2)]\bmod 10240.$ Where $SFN_{start\ time}$ and $\text{subframe}_{start\ time}$ are the SFN and subframe, respectively, at the time the configured uplink grant were (re-)initialised.

For TDD, the MAC entity is configured with semiPersistSchedIntervalUL shorter than ten (10) subframes, the $N^{th}$ grant shall be ignored if it occurs in a downlink subframe or a special subframe.

If the MAC entity is not configured with skipUplinkTx-SPS, the MAC entity shall clear the configured uplink grant immediately after implicitReleaseAfter number of consecutive new MAC PDUs each containing zero MAC SDUs have been provided by the Multiplexing and Assembly entity, on the Semi-Persistent Scheduling resource.
  If SPS confirmation has been triggered and not cancelled:
    if the MAC entity has UL resources allocated for new transmission for this TTI:
      instruct the Multiplexing and Assembly procedure to generate an SPS confirmation MAC Control Element as defined in subclause 6.1.3.11 of LTE; Evolved Universal Terrestrial Radio Access (E-UTRA); Medium Access Control (MAC) protocol specification, 3GPP TS 36.321, version 14.2.1 Release 14 (March 2017);
      cancel the triggered SPS confirmation.
  The MAC entity shall clear the configured uplink grant immediately after first transmission of SPS confirmation MAC Control Element triggered by the SPS release.
  NOTE: Retransmissions for Semi-Persistent Scheduling may continue after clearing the configured uplink grant.
  For BL UEs or UEs in enhanced coverage $SFN_{start\ time}$ and $\text{subframe}_{start\ time}$ refer to SFN and subframe of the first transmission of PUSCH where configured uplink grant was (re-) initialized.
  If in one subframe, the MAC entity has multiple Semi-Persistent Scheduling uplink grants corresponding to different UL SPS configurations configured with Uplink Semi-Persistent Scheduling V-RNTI, the MAC entity processes the Semi-Persistent Scheduling uplink grant with lowest sps-ConfigIndex.

Figure 23:
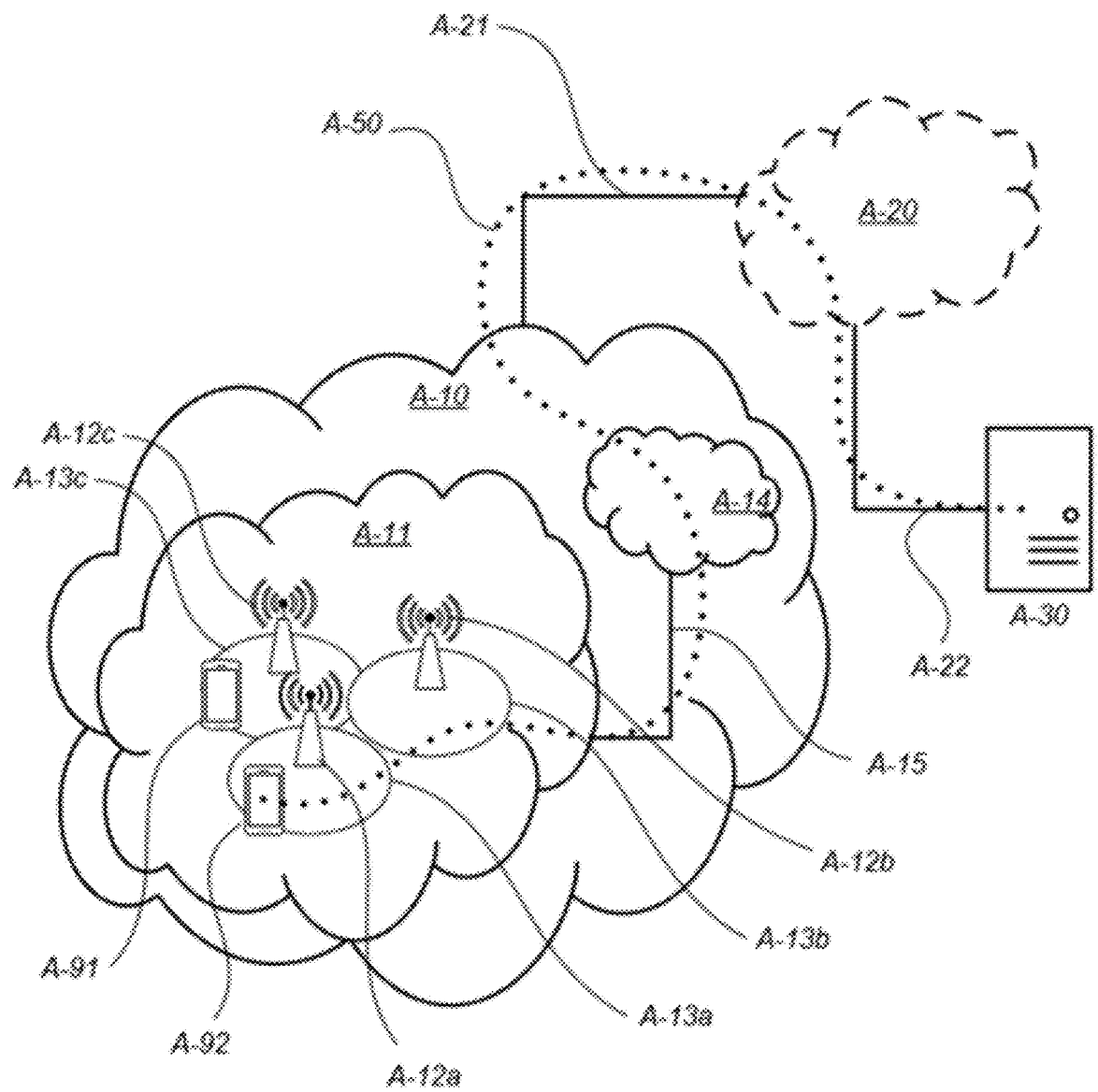
FIG. 23 schematically illustrates a telecommunication network connected via an intermediate network to a host computer in accordance with various aspects as described herein.

FIG. 23 schematically illustrates a telecommunication network connected via an intermediate network to a host computer in accordance with various aspects as described herein. In FIG. 23, in accordance with an embodiment, a communication system includes a telecommunication network A-10, such as a 3GPP-type cellular network, which comprises an access network A-11, such as a radio access network, and a core network A-14. The access network A-11 comprises a plurality of base stations A-12a, A-12b, A-12c, such as NBs, eNBs, gNBs or other types of wireless access points, each defining a corresponding coverage area A-13a, A-13b, A-13c. In an aspect, any of base stations A-12a, A-12b, A-12c, or any other base stations described herein may be considered to be a network node, for instance, if such as network node is described above in the present Application. Each base station A-12a, A-12b, A-12c is connectable to the core network A-14 over a wired or wireless connection A-15. A first UE A-91 located in coverage area A-13c is configured to wirelessly connect to, or be paged by, the corresponding base station A-12c. A second UE A-92 in coverage area A-13a is wirelessly connectable to the corresponding base station A-12a. While a plurality of UEs A-91, A-92 are illustrated in this example, the disclosed embodiments are equally applicable to a situation where a sole UE is in the coverage area or where a sole UE is connecting to the corresponding base station A-12. In an aspect, any of these UEs, or any other UE described herein may be considered to be configured to perform the aspects of any UE, user terminal, client device, or mobile device described above in the present Application.

The telecommunication network A-10 is itself connected to a host computer A-30, which may be embodied in the hardware and/or software of a standalone server, a cloud-implemented server, a distributed server or as processing resources in a server farm. The host computer A-30 may be under the ownership or control of a service provider, or may be operated by the service provider or on behalf of the service provider. The connections A-21, A-22 between the telecommunication network A-10 and the host computer A-30 may extend directly from the core network A-14 to the host computer A-30 or may go via an optional intermediate network A-20. The intermediate network A-20 may be one of, or a combination of more than one of, a public, private or hosted network; the intermediate network A-20, if any, may be a backbone network or the Internet; in particular, the intermediate network A-20 may comprise two or more sub-networks (not shown).

The communication system of FIG. 23 as a whole enables connectivity between one of the connected UEs A-91, A-92 and the host computer A-30. The connectivity may be described as an over-the-top (OTT) connection A-50. The host computer A-30 and the connected UEs A-91, A-92 are configured to communicate data and/or signaling via the OTT connection A-50, using the access network A-11, the core network A-14, any intermediate network A-20 and possible further infrastructure (not shown) as intermediaries. The OTT connection A-50 may be transparent in the sense that the participating communication devices through which the OTT connection A-50 passes are unaware of routing of uplink and downlink communications. For example, a base station A-12 may not or need not be informed about the past routing of an incoming downlink communication with data originating from a host computer A-30 to be forwarded (e.g., handed over) to a connected UE A-91. Similarly, the base station A-12 need not be aware of the future routing of an outgoing uplink communication originating from the UE A-91 towards the host computer A-30.

Figure 24:
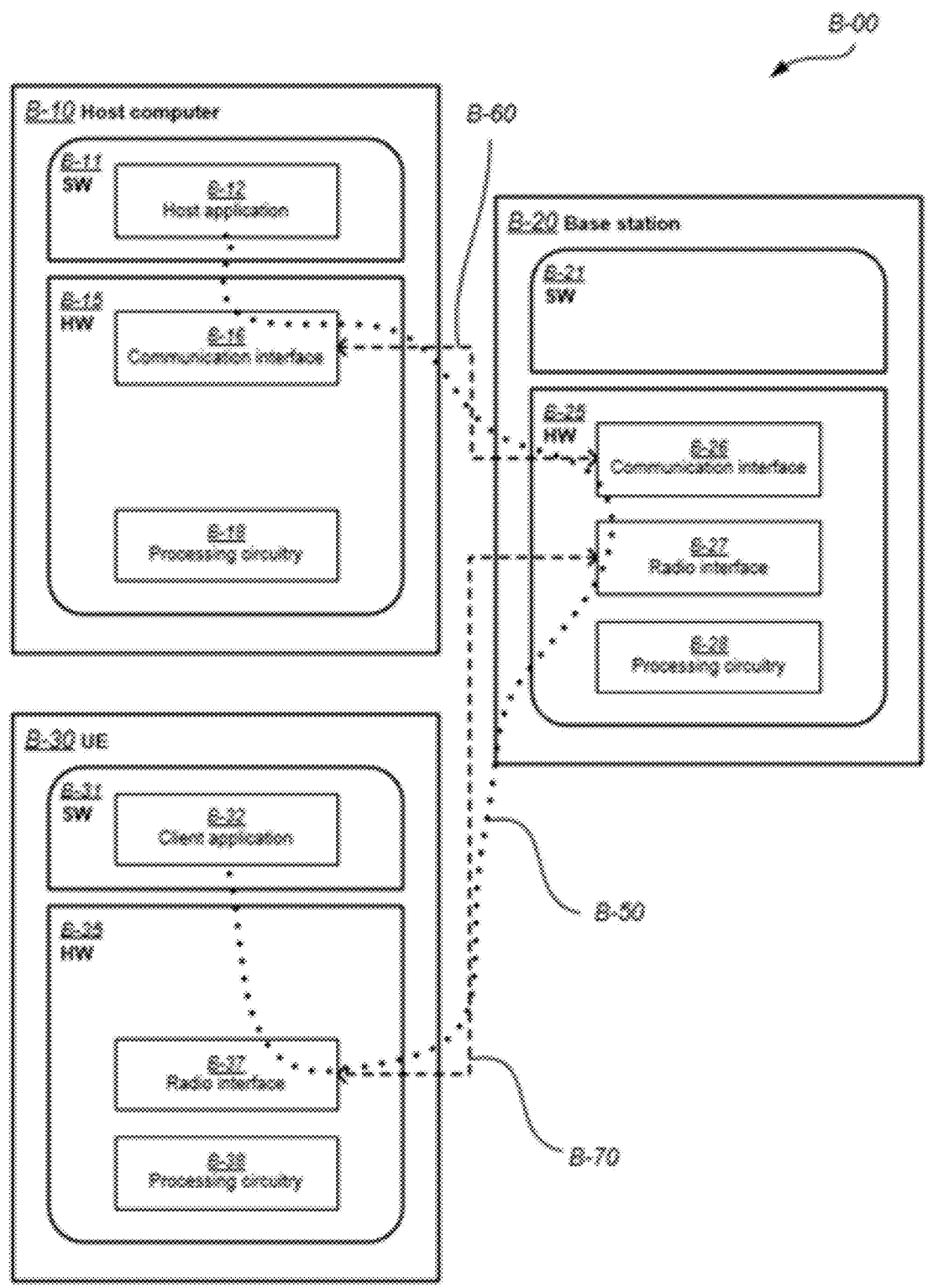
FIG. 24 is a generalized block diagram of a host computer communicating via a base station with a user equipment over a partially wireless connection in accordance with various aspects as described herein.

Example implementations, in accordance with an embodiment, of the UE, base station and host computer discussed in the preceding paragraphs will now be described with reference to FIG. 24, which is shown below. FIG. 24 is a generalized block diagram of a host computer communicating via a base station with a UE over a partially wireless connection in accordance with various aspects as described herein.

In a communication system B-00, a host computer B-10 comprises hardware B-15 including a communication interface B-16 configured to set up and maintain a wired or wireless connection with an interface of a different communication device of the communication system B-00. The host computer B-10 further comprises processing circuitry B-18, which may have storage and/or processing capabilities. In particular, the processing circuitry B-18 may comprise one or more programmable processors, application-specific integrated circuits, field programmable gate arrays or combinations of these (not shown) adapted to execute instructions. The host computer B-10 further comprises software B-11, which is stored in or accessible by the host computer B-10 and executable by the processing circuitry B-18. The software B-11 includes a host application B-12. The host application B-12 may be operable to provide a service to a remote user, such as a UE B-30 connecting via an OTT connection B-50 terminating at the UE B-30 and the host computer B-10. In providing the service to the remote user, the host application B-12 may provide user data which is transmitted using the OTT connection B-50.

The communication system B-00 further includes a base station B-20 provided in a telecommunication system and comprising hardware B-25 enabling it to communicate with the host computer B-10 and with the UE B-30. The hardware B-25 may include a communication interface B-26 for setting up and maintaining a wired or wireless connection with an interface of a different communication device of the communication system B-00, as well as a radio interface B-27 for setting up and maintaining at least a wireless connection B-70 with a UE B-30 located in a coverage area (not shown in FIG. 24) served by the base station B-20.

The communication interface B-26 may be configured to facilitate a connection B-60 to the host computer B-10. The connection B-60 may be direct or it may pass through a core network (not shown in FIG. 24) of the telecommunication system and/or through one or more intermediate networks outside the telecommunication system. In the embodiment shown, the hardware B-25 of the base station B-20 further includes processing circuitry B-28, which may comprise one or more programmable processors, application-specific integrated circuits, field programmable gate arrays or combinations of these (not shown) adapted to execute instructions. The base station B-20 further has software B-21 stored internally or accessible via an external connection.

The communication system B-00 further includes the UE B-30, which has already been referred to above. Its hardware B-35 may include a radio interface B-37 configured to set up and maintain a wireless connection B-70 with a base station serving a coverage area in which the UE B-30 is currently located. The hardware B-35 of the UE B-30 further includes processing circuitry B-38, which may comprise one or more programmable processors, application-specific integrated circuits, field programmable gate arrays or combinations of these (not shown) adapted to execute instructions. The UE B-30 further comprises software B-31, which is stored in or accessible by the UE B-30 and executable by the processing circuitry B-38.

The software B-31 includes a client application B-32. The client application B-32 may be operable to provide a service to a human or non-human user via the UE B-30, with the support of the host computer B-10. In the host computer B-10, an executing host application B-12 may communicate with the executing client application B-32 via the OTT connection B-50 terminating at the UE B-30 and the host computer B-10. In providing the service to the user, the client application B-32 may receive request data from the host application B-12 and provide user data in response to the request data. The OTT connection B-50 may transfer both the request data and the user data. The client application B-32 may interact with the user to generate the user data that it provides.

It is noted that the host computer B-10, base station B-20 and UE B-30 illustrated in FIG. 24 may be identical to the host computer A-30, one of the base stations A-12a, A-12b, A-12c and one of the UEs A-91, A-92 of FIG. 23, respectively. This is to say, the inner workings of these entities may be as shown in FIG. 24 and independently, the surrounding network topology may be that of FIG. 23.

In FIG. 24, the OTT connection B-50 has been drawn abstractly to illustrate the communication between the host computer B-10 and the use equipment B-30 via the base station B-20, without explicit reference to any intermediary devices and the precise routing of messages via these devices. Network infrastructure may determine the routing, which it may be configured to hide from the UE B-30 or from the service provider operating the host computer B-10, or both. While the OTT connection B-50 is active, the network infrastructure may further take decisions by which it dynamically changes the routing (e.g., on the basis of load balancing consideration or reconfiguration of the network).

The wireless connection B-70 between the UE B-30 and the base station B-20 is in accordance with the teachings of the embodiments described throughout this disclosure. One or more of the various embodiments improve the performance of OTT services provided to the UE B-30 using the OTT connection B-50, in which the wireless connection B-70 forms the last segment. More precisely, the teachings of these embodiments can improve one or more of data rate, latency, and/or power consumption associated with one or more devices and/or communications of/performed in communication system B-00, and thereby can provide benefits for OTT user data communication, such as one or more of reduced user waiting time, relaxed restriction on file size, better responsiveness, and/or extended battery lifetime.

A measurement procedure may be provided for the purpose of monitoring data rate, latency and other factors on which the one or more embodiments improve. There may further be an optional network functionality for reconfiguring the OTT connection B-50 between the host computer B-10 and UE B-30, in response to variations in the measurement results. The measurement procedure and/or the network functionality for reconfiguring the OTT connection B-50 may be implemented in the software B-11 of the host computer B-10 or in the software B-31 of the UE B-30, or both.

In embodiments, sensors (not shown) may be deployed in or in association with communication devices through which the OTT connection B-50 passes; the sensors may participate in the measurement procedure by supplying values of the monitored quantities exemplified above, or supplying values of other physical quantities from which software B-11, B-31 may compute or estimate the monitored quantities. The reconfiguring of the OTT connection B-50 may include message format, retransmission settings, preferred routing etc.; the reconfiguring need not affect the base station B-20, and it may be unknown or imperceptible to the base station B-20.

Such procedures and functionalities may be known and practiced in the art. In certain embodiments, measurements may involve proprietary UE signaling facilitating the host computer's B-10 measurements of throughput, propagation times, latency and the like. The measurements may be implemented in that the software B-11, B-31 causes messages to be transmitted, in particular empty or 'dummy' messages, using the OTT connection B-50 while it monitors propagation times, errors etc.

FIGS. 25-28 (below) are flowcharts illustrating methods implemented in a communication system including a host computer, a base station, and a user equipment.

Figure 25:
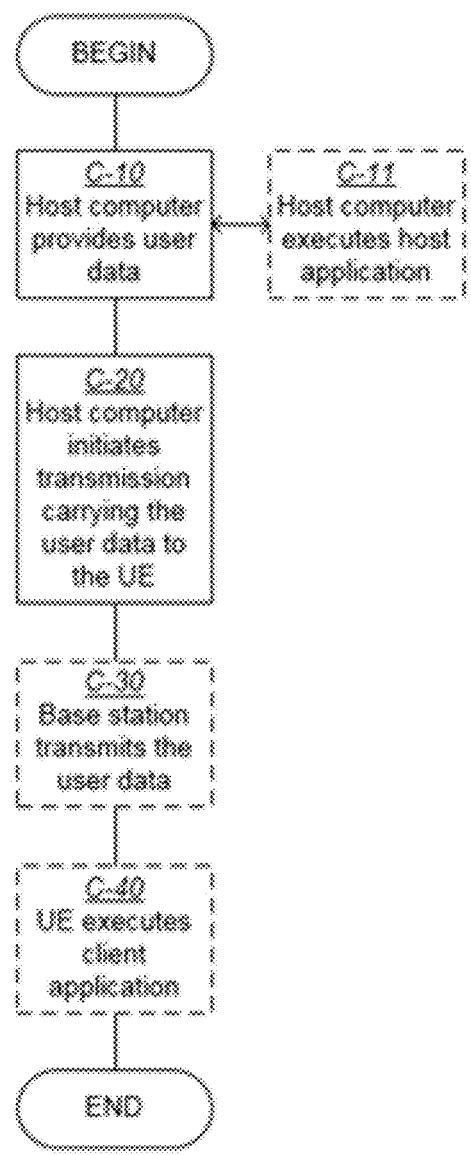
FIG. 25 is a flowchart illustrating a method implemented in a communication system, in accordance with one embodiment.

FIG. 25 is a flowchart illustrating a method implemented in a communication system, in accordance with one embodiment. The communication system includes a host computer, a base station and a UE which may be those described with reference to FIGS. 23-24. For simplicity of the present disclosure, only drawing references to FIG. 25 will be included in this section. In a first step C-10 of the method, the host computer provides user data.

In an optional substep C-11 of the first step C-10, the host computer provides the user data by executing a host application. In a second step C-20, the host computer initiates a transmission carrying the user data to the UE.

In an optional third step C-30, the base station transmits to the UE the user data which was carried in the transmission that the host computer initiated, in accordance with the teachings of the embodiments described throughout this disclosure. In an optional fourth step C-40, the UE executes a client application associated with the host application executed by the host computer.

Figure 26:
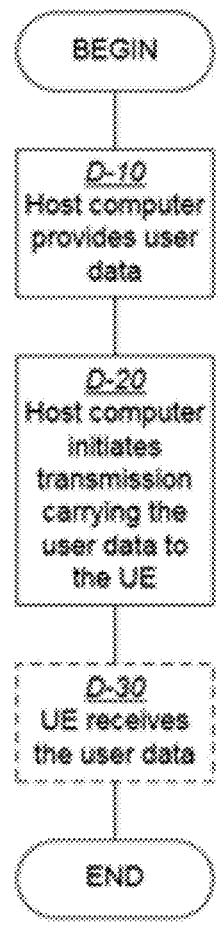
FIG. 26 is a flowchart illustrating a method implemented in a communication system, in accordance with one embodiment.

FIG. 26 is a flowchart illustrating a method implemented in a communication system, in accordance with one embodiment. The communication system includes a host computer, a base station and a UE which may be those described with reference to FIGS. 23-24. For simplicity of the present disclosure, only drawing references to FIG. 26 will be included in this section. In a first step D-10 of the method, the host computer provides user data.

In an optional substep (not shown) the host computer provides the user data by executing a host application. In a second step D-20, the host computer initiates a transmission carrying the user data to the UE. The transmission may pass via the base station, in accordance with the teachings of the embodiments described throughout this disclosure. In an optional third step D-30, the UE receives the user data carried in the transmission.

Figure 27:
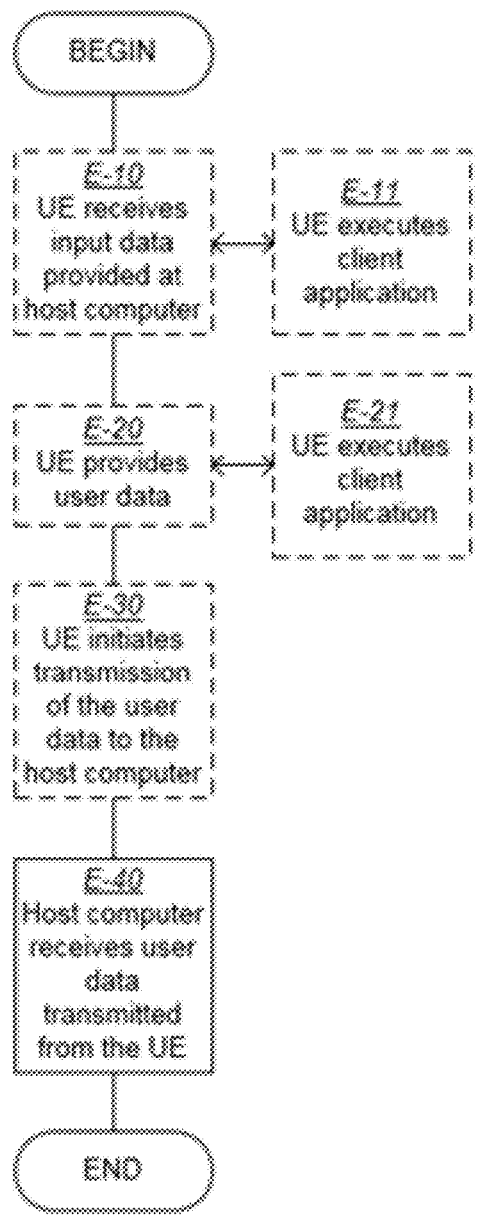
FIG. 27 is a flowchart illustrating a method implemented in a communication system, in accordance with one embodiment.

FIG. 27 is a flowchart illustrating a method implemented in a communication system, in accordance with one embodiment. The communication system includes a host computer, a base station and a UE which may be those described with reference to FIGS. 23-24. For simplicity of the present disclosure, only drawing references to FIG. 27 will be included in this section. In an optional first step E-10 of the method, the UE receives input data provided by the host computer. Additionally or alternatively, in an optional second step E-20, the UE provides user data. In an optional substep E-21 of the second step E-20, the UE provides the user data by executing a client application. In a further optional substep E-11 of the first step E-10, the UE executes a client application which provides the user data in reaction to the received input data provided by the host computer. In providing the user data, the executed client application may further consider user input received from the user. Regardless of the specific manner in which the user data was provided, the UE initiates, in an optional third substep E-30, transmission of the user data to the host computer. In a fourth step E-40 of the method, the host computer receives the user data transmitted from the UE, in accordance with the teachings of the embodiments described throughout this disclosure.

Figure 28:
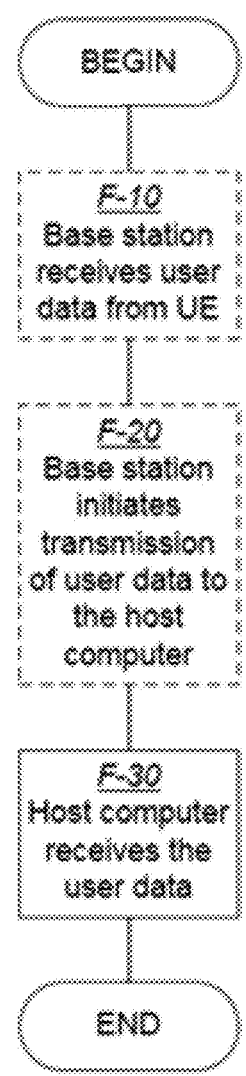
FIG. 28 is a flowchart illustrating a method implemented in a communication system, in accordance with one embodiment.

FIG. 28 is a flowchart illustrating a method implemented in a communication system, in accordance with one embodiment. The communication system includes a host computer, a base station and a UE which may be those described with reference to FIGS. 23-24. For simplicity of the present disclosure, only drawing references to FIG. 28 will be included in this section.

In an optional first step F-10 of the method, in accordance with the teachings of the embodiments described throughout this disclosure, the base station receives user data from the UE.

In an optional second step F-20, the base station initiates transmission of the received user data to the host computer.

In a third step F-30, the host computer receives the user data carried in the transmission initiated by the base station.

In one embodiment, a base station is configured to communicate with a UE. The base station comprises a radio interface and processing circuitry configured to perform aspects of example embodiments described throughout the present disclosure.

In one embodiment, a communication system includes a host computer that comprises processing circuitry configured to provide user data. The host computer further includes a communication interface configured to forward the user data to a cellular network for transmission to a UE. In addition, the cellular network includes a base station having a radio interface and processing circuitry. The base station's processing circuitry is configured to perform aspects of example embodiments described throughout the present disclosure, including aspects related to forwarding the user data to the UE.

In another embodiment, the communication system includes the base station.

In another embodiment, the communication system further includes the UE, wherein the UE is configured to communicate with the base station.

In another embodiment, the processing circuitry of the host computer is configured to execute a host application, thereby providing the user data. Further, the UE comprises processing circuitry configured to execute a client application associated with the host application.

In another embodiment, the communication system includes aspects of example embodiments described throughout the present disclosure, including aspects related to transmitting user data to a UE.

In one embodiment, a method implemented in a communication system includes a host computer, a base station and a UE. The method includes, at the host computer, providing user data. Further, the method includes, at the host computer, initiating a transmission carrying the user data to the UE via a cellular network comprising the base station. The base station is configured to perform aspects of example embodiments described throughout the present disclosure, included aspects related to transmitting the user data to the UE.

In another embodiment, the method includes, at the base station, transmitting the user data.

In another embodiment, the user data is provided at the host computer by executing a host application. Further, the method further comprises, at the UE, executing a client application associated with the host application.

In one embodiment, a UE is configured to communicate with a base station. Further, the UE comprises a radio interface and processing circuitry configured to perform aspects of example embodiments described throughout the present disclosure, including aspects related to receiving user data from the base station.

In one embodiment, a communication system includes a host computer comprising processing circuitry configured to provide user data. The host computer further comprises a communication interface configured to forward user data to a cellular network for transmission to a UE. Further, the UE comprises a radio interface and processing circuitry, the UE's processing circuitry is configured to perform aspects of example embodiments described throughout the present disclosure, including aspects related to the UE receiving the user data from the base station.

In another embodiment, the communication system includes the UE.

In another embodiment, the cellular network further includes a base station configured to communicate with the UE.

In another embodiment, the processing circuitry of the host computer is configured to execute a host application, thereby providing the user data. Further, the UE's processing circuitry is configured to execute a client application associated with the host application.

In one embodiment, a method implemented in a UE comprises aspects of example embodiments described throughout the present disclosure, including aspects related to the UE receiving user data from a base station.

In one embodiment, a method implemented in a communication system includes a host computer, a base station, and a UE. The method comprises, at the host computer, providing user data. Further, the method comprises, at the host computer, initiating a transmission carrying the user data to the UE via a cellular network comprising the base station. In addition, the UE is configured to perform aspects of example embodiments described throughout the present disclosure, including aspects related to the UE receiving the user data from the base station.

In another embodiment, the method includes, at the UE, receiving the user data from the base station.

In one embodiment, a UE is configured to communicate with a base station. The UE comprises a radio interface and processing circuitry configured to perform aspects of example embodiments described throughout the present disclosure, including aspects related to the UE transmitting user data to the base station.

In one embodiment, a communication system includes a host computer comprising a communication interface configured to receive user data originating from a transmission from a UE to a base station. Further, the UE comprises a radio interface and processing circuitry. The UE's processing circuitry is configured to perform aspects of example embodiments described throughout the present disclosure, including aspects related to the UE transmitting user data to the base station.

In another embodiment, the communication system further includes the UE.

In another embodiment, the communication system further includes the base station. The base station comprises a radio interface configured to communicate with the UE and a communication interface configured to forward to the host computer the user data carried by a transmission from the UE to the base station.

In another embodiment, the processing circuitry of the host computer is configured to execute a host application. Further, the UE's processing circuitry is configured to execute a client application associated with the host application, thereby providing the user data.

In another embodiment, the processing circuitry of the host computer is configured to execute a host application, thereby providing request data. Further, the UE's processing circuitry is configured to execute a client application associated with the host application, thereby providing the user data in response to the request data.

In one embodiment, a method implemented in a UE comprises aspects of example embodiments described throughout the present disclosure, including aspects related to the UE transmitting user data to a base station.

In another embodiment, the method includes providing user data. Further, the method includes forwarding the user data to a host computer via the transmission to the base station.

In one embodiment, a method implemented in a communication system includes a host computer, a base station, and a UE. The method comprises, at the host computer, receiving user data transmitted to the base station from the UE. Further, the UE is configured to perform aspects of example embodiments described throughout the present disclosure, including aspects related to the UE transmitting user data to the base station.

In another embodiment, the method includes, at the UE, providing the user data to the base station.

In another embodiment, the method includes, at the UE, executing a client application, thereby providing the user data to be transmitted. Further, the method includes, at the host computer, executing a host application associated with the client application.

In another embodiment, the method includes, at the UE, executing a client application. Further, the method includes, at the UE, receiving input data to the client application, the input data being provided at the host computer by executing a host application associated with the client application. In addition, the user data to be transmitted is provided by the client application in response to the input data.

In one embodiment, a base station is configured to communicate with a UE. Further, the base station comprises a radio interface and processing circuitry configured to perform aspects of example embodiments described throughout the present disclosure, including aspects related to the base station receiving user data from the UE.

In one embodiment, a communication system includes a host computer comprising a communication interface configured to receive user data originating from a transmission from a UE to a base station. Further, the base station comprises a radio interface and processing circuitry. The base station's processing circuitry is configured to perform aspects of example embodiments described throughout the present disclosure, including aspects related to the base station receiving user data from the UE.

In another embodiment, the communication system includes the base station.

In another embodiment, the communication system includes the UE. Further, the UE is configured to communicate with the base station.

In another embodiment, the processing circuitry of the host computer is configured to execute a host application. Further, the UE is configured to execute a client application associated with the host application, thereby providing the user data to be received by the host computer.

In one embodiment, a method implemented in a base station comprises performing aspects of example embodiments described throughout the present disclosure, including aspects related to the base station receiving user data from a UE.

In one embodiment, a method implemented in a communication system includes a host computer, a base station, and a UE. The method comprises, at the host computer, receiving, from the base station, user data originating from a transmission, which the base station has received from the UE. Further, one or both of the base station and the UE are configured to perform aspects of example embodiments described throughout the present disclosure, including aspects related to the base station receiving user data from the UE and/or aspects related to the UE transmitting user data to the base station.

In another embodiment, the method includes, at the base station, receiving the user data from the UE.

In another embodiment, the method includes, at the base station, initiating a transmission of the received user data to the host computer.

ABBREVIATIONS

| Abbreviation | Explanation |
| --- | --- |
| 3G | Third Generation of Mobile Telecommunications Technology |
| 3GPP | 3rd Generation Partnership Project |
| 5G | 5th Generation mobile networks or wireless systems |
| BS | Base Station |
| BSM | Basic Safety Message |
| CAM | Cooperative Awareness Message |
| CE | Control Element |
| CP | Cyclic Prefix |
| CRC | Cyclic Redundancy Check |
| CRS | Cell Specific Reference Signal |
| CSI | Channel State Information |
| CSI-RS | Channel state information reference signal |
| CSS | Common Search Space |
| D2D | Device-to-Device Communication |
| DBS | Delay-Based Scheduler |
| DENM | Decentralized Environmental Notification Message |
| DL | Downlink |
| DMRS | Demodulation reference signal |
| DPTF | Data Packet Transmission Format |
| DSRC | Dedicated Short-Range Communications |
| eNB | Evolved Node B (i.e., base station) |
| E-UTRA | Evolved Universal Terrestrial Radio Access |
| E-UTRAN | Evolved Universal Terrestrial Radio Access Network |
| DFT | Discrete Fourier Transform |
| ETSI | European Telecommunications Standards Institute |
| FDD | Frequency Division Duplex |
| IFFT | Inverse Fast Fourier Transform |
| IoT | Internet of Things |
| IP | Internet Protocol |
| LCG | Logical Channel Group |
| LCID | Logical Channel Identity |
| LTE | Long Term Evolution |
| MAC | Medium Access Control |
| MAC CE | MAC Control Element |
| MIMO | Multiple Input Multiple Output |
| MSR | Multi-Standard Radio |
| MTC | Machine-Type Communication |
| NB | Narrow-Band |
| NB-IoT | Narrow-Band Internet of Things |
| NB-LTE | Narrow-Band LTE (e.g., 180 KHz bandwidth) |
| NB-PBCH | NB-IoT Physical Broadcast Channel |
| NB-PSS | NB-IoT Primary Synchronization Sequence |
| NB-SSS | NB-IoT Secondary Synchronization Sequence |
| NW | Network |
| OCC | Orthogonal cover code |
| OFDM | Orthogonal Frequency Division Modulation |
| OFDMA | Orthogonal Frequency Division Modulation Access |
| PA | Power Amplifier |
| PAPR | Peak-to-Average Power Ratio |
| PBCH | Physical Broadcast Channel |
| PDCCH | Physical Data Control Channel |
| PDCP | Packet Data Convergence Protocol (PDCP) |
| PDU | Protocol Data Unit |
| PPPP | Proximity services Per Packet Priority |
| PRACH | Physical Random Access Channel |
| PRB | Physical Resource Block |
| ProSe | Proximity Services |
| PSD | Power Spectral Density |
| PSS | Primary Synchronization Sequence |
| PUSCH | Physical Uplink Shared Channel |
| RACH | Random Access Channel |
| RAT | Radio Access Technology |
| RBR | Recommended Bit Rate |
| RF | Radio Frequency |
| RR | Radio Resource |
| RRC | Radio Resource Control |
| RS | Reference signal |
| RX | Receiver |
| SAE | Society of the Automotive Engineers |
| SC-FDMA | Single-Carrier, Frequency Division Multiple Access |
| SFBC | Space Frequency Block Coding |
| SIB | System Information Block |
| SIM | Subscriber Identity Module or Subscriber Identification Module |
| SL | Sidelink |
| SNR | Signal to Noise Ratio |
| SoC | System-on-a-Chip |
| SPS | Semi Persistent Scheduling |
| SRS | Sounding Reference Signal |
| SS | Synchronization Signal |
| SSS | Secondary Synchronization Sequence |
| TDD | Time Division Duplex |
| TF | Transpor Format |
| TRP | Transmission/Reception Point |
| TSS | Tertiary synchronization signal or Time synchronization signal |
| TTI | Transmission Time Interval |
| TX | Transmitter |
| UE | User Equipment |
| UL | Uplink |
| USS | UE-specific Search Space |
| V2I | Vehicle-to-Infrastructure |
| V2P | Vehicle-to-Pedestrian |
| V2V | Vehicle-to-vehicle communication |
| V2x | Vehicle-to-anything-you-can-imagine |
| WB-LTE | Wideband LTE (i.e., corresponds to legacy LTE) |
| ZC | Zadoff-Chu algorithm |

The various aspects described herein may be implemented using standard programming or engineering techniques to produce software, firmware, hardware (e.g., circuits), or any combination thereof to control a computing device to implement the disclosed subject matter. It will be appreciated that some embodiments may be comprised of one or more generic or specialized processors such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the methods, devices and systems described herein. Alternatively, some or all functions may be implemented by a state machine that has no stored program instructions, or in one or more application specific integrated circuits (ASICs), in which each function or some combinations of certain of the functions are implemented as custom logic circuits. Of course, a combination of the two approaches may be used. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The term "article of manufacture" as used herein is intended to encompass a computer program accessible from any computing device, carrier, or media. For example, a computer-readable medium may include: a magnetic storage device such as a hard disk, a floppy disk or a magnetic strip; an optical disk such as a compact disk (CD) or digital versatile disk (DVD); a smart card; and a flash memory device such as a card, stick or key drive. Additionally, it should be appreciated that a carrier wave may be employed to carry computer-readable electronic data including those used in transmitting and receiving electronic data such as electronic mail (e-mail) or in accessing a computer network such as the Internet or a local area network (LAN). Of course, a person of ordinary skill in the art will recognize many modifications may be made to this configuration without departing from the scope or spirit of the subject matter of this disclosure.

Throughout the specification and the embodiments, the following terms take at least the meanings explicitly associated herein, unless the context clearly dictates otherwise. Relational terms such as "first" and "second," and the like may be used solely to distinguish one entity or action from another entity or action without necessarily requiring or implying any actual such relationship or order between such entities or actions. The term "or" is intended to mean an inclusive "or" unless specified otherwise or clear from the context to be directed to an exclusive form. Further, the terms "a," "an," and "the" are intended to mean one or more unless specified otherwise or clear from the context to be directed to a singular form. The term "include" and its various forms are intended to mean including but not limited to. References to "one embodiment," "an embodiment," "example embodiment," "various embodiments," and other like terms indicate that the embodiments of the disclosed technology so described may include a particular function, feature, structure, or characteristic, but not every embodiment necessarily includes the particular function, feature, structure, or characteristic. Further, repeated use of the phrase "in one embodiment" does not necessarily refer to the same embodiment, although it may. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. A device or structure that is "configured" in a certain way is configured in at least that way, but may also be configured in ways that are not listed.

What is claimed is:

1. A method performed by a wireless device in a wireless communications system, comprising:
   obtaining selection criteria that is predefined or configured as being the criteria by which both the wireless device and a network node or another wireless device selects one of multiple activated semi-persistent configurations assigned to the wireless device responsive to determining that the multiple configurations have granted a same radio resource comprising a same frequency resource;
   selecting one of the multiple configurations based on the selection criteria; and
   transmitting or receiving on that radio resource in accordance with the selected configuration.

2. The method of claim 1, wherein the selection criteria is based on at least one of:
   an index that identifies each configuration;
   a size of a grant of radio resources for each configuration; and
   a priority of each configuration.

3. The method of claim 1, wherein said selecting includes selecting one of the multiple configurations that has a lowest or highest value of an index that identifies each configuration.

4. The method of claim 1, wherein said selecting includes selecting one of the multiple configurations that has a lowest or highest value of an sps-ConfigIndex parameter that is used to identify each multiple configuration.

5. The method of claim 1, wherein said selecting includes selecting one of the multiple configurations that has a largest size of a grant of radio resources.

6. The method of claim 1, wherein said selecting includes selecting one of the multiple configurations that has a highest priority or is prioritized over the other configurations.

7. The method of claim 1, further comprising:
   receiving, from the network node or the other wireless device, an indication of the selection criteria.

8. The method of claim 1, further comprising:
   enabling the wireless device for semi-persistent scheduling of radio resources.

9. The method of claim 1, further comprising:
   determining to enable semi-persistent scheduling of radio resources for wireless communications between the wireless device and the other wireless device; and
   transmitting, to the other wireless device, an indication to enable the other wireless device for semi-persistent scheduling of radio resources.

10. The method of claim 1, further comprising:
    determining the selection criteria for the other wireless device associated with peer-to-peer communications between the wireless device and the other wireless device; and
    transmitting, to the other wireless device, an indication of the selection criteria.

11. The method of claim 1, wherein the multiple configurations are related to a semi-persistent scheduler (SPS) protocol.

12. The method of claim 1, wherein each configuration has a different type of data traffic.

13. The method of claim 1, wherein data traffic of each configuration has a different periodicity.

14. The method of claim 1, wherein the radio resource is used to carry periodic data traffic.

15. The method of claim 1, wherein the radio resource is a time and frequency resource.

16. The method of claim 1, wherein the radio resource is in a certain transmission time interval (TTI).

17. The method of claim 1, wherein the network node is a base station, the wireless device is a user equipment (UE), and the system is a terrestrial cellular network.

18. The method of claim 1, wherein the wireless device and the other wireless device are user equipment (UE) and the system is a device-to-device (D2D) wireless communications system.

19. The method of claim 18, wherein the D2D wireless communications system is a sidelink wireless communications system.

20. The method of claim 1, further comprising:
receiving, from the network node or the other wireless device, an indication of the selection criteria by which both the wireless device and the network node or the other wireless device selects one of multiple activated semi-persistent configurations assigned to the wireless device responsive to determining that the multiple configurations have granted the same radio resource comprising a same frequency resource.

21. The method of claim 1, wherein the same radio resource is a radio resource in a same TTI or in a same subframe.

22. A wireless device, comprising:
at least one processor and a memory, the memory comprising instructions executable by the at least one processor whereby the wireless device is configured to:
obtain selection criteria that is predefined or configured as being the criteria by which both the wireless device and a network node or another wireless device selects one of multiple activated semi-persistent configurations assigned to the wireless device responsive to determining that the multiple configurations have granted a same radio resource comprising a same frequency resource;
select one of the multiple configurations based on the selection criteria; and
transmit or receive on that radio resource in accordance with the selected configuration.

23. A method performed by a network node in a wireless communications system, comprising:
obtaining selection criteria that is predefined or configured as being the criteria by which both the network node and a wireless device selects one of multiple activated semi-persistent configurations assigned to the wireless device responsive to determining that the multiple configurations have granted a same radio resource comprising a same frequency resource;
selecting one of the multiple configurations based on the selection criteria; and
transmitting or receiving, to or from the wireless device, on that radio resource in accordance with the selected configuration.

24. The method of claim 23, wherein the selection criteria is based on at least one of:
an index that identifies each configuration;
a size of a grant of radio resources for each configuration; and
a priority of each configuration.

25. The method of claim 23, wherein said selecting includes selecting one of the multiple configurations that has a lowest or highest value of an index that identifies each configuration.

26. The method of claim 23, wherein said selecting includes selecting one of the multiple configurations that has a lowest or highest value of an sps-ConfigIndex parameter that is used to identify each multiple configuration.

27. The method of claim 23, wherein said selecting includes selecting one of the multiple configurations that has a largest size of a grant of radio resources.

28. The method of claim 23, wherein said selecting includes selecting one of the multiple configurations that has a highest priority or is prioritized over the other configurations.

29. The method of claim 23, further comprising:
determining to enable the network node and the wireless device for semi-persistent scheduling of radio resources for wireless communications between the network node and the wireless device; and
transmitting, to the wireless device, an indication to enable semi-persistent scheduling of radio resources.

30. The method of claim 23, further comprising:
determining the selection criteria for the wireless device; and
transmitting, to the wireless device, an indication of the selection criteria.

31. The method of claim 23, further comprising:
in response to determining that the multiple configurations assigned to the wireless device have granted the same radio resource, assigning, to one or more other wireless devices, that radio resource for those configurations that are not selected for transmission or reception on that radio resource.

32. The method of claim 23, further comprising:
in response to determining that the multiple configurations assigned to the wireless device have granted the same radio resource, assigning, to the wireless device, one or more other radio resources that is capable of carrying data that is intended for transmission or reception on that same radio resource for each multiple configuration.

33. The method of claim 32, further comprising:
prioritizing the one or more other radio resources as having a higher priority than the radio resource.

34. The method of claim 23, wherein the same radio resource is a radio resource in a same TTI or in a same subframe.

35. A network node, comprising:
at least one processor and a memory, the memory comprising instructions executable by the at least one processor whereby the network node is configured to:
obtain selection criteria that is predefined or configured as being the criteria by which both the network node and a wireless device selects one of multiple activated semi-persistent configurations assigned to the wireless device responsive to determining that the multiple configurations have granted a same radio resource comprising a same frequency resource;
select one of the multiple configurations based on the selection criteria; and
transmit or receive, to or from the wireless device, on that radio resource in accordance with the selected configuration.

* * * * *